(12) United States Patent
Sung et al.

(10) Patent No.: US 10,412,658 B2
(45) Date of Patent: *Sep. 10, 2019

(54) METHODS AND SYSTEMS FOR COMMUNICATIONS THROUGH A SLAVE GATEWAY

(71) Applicant: Pismo Labs Technology Limited, Kowloon (HK)

(72) Inventors: Patrick Ho Wai Sung, Kowloon (HK); Kit Wai Chau, Kowloon (HK); Wan Chun Leung, New Territories (HK); Kam Chiu Ng, New Territories (HK)

(73) Assignee: PISMO LABS TECHNOLOGY LIMITED, Hong Kong (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/682,304

(22) Filed: Aug. 21, 2017

(65) Prior Publication Data

US 2017/0353908 A1  Dec. 7, 2017

Related U.S. Application Data

(63) Continuation of application No. 14/889,441, filed as application No. PCT/IB2014/067442 on Dec. 31, 2014, now Pat. No. 9,743,338.

(51) Int. Cl.
*H04W 40/24* (2009.01)
*H04L 12/64* (2006.01)
(Continued)

(52) U.S. Cl.
CPC ......... *H04W 40/24* (2013.01); *H04L 12/6418* (2013.01); *H04L 12/66* (2013.01);
(Continued)

(58) Field of Classification Search
CPC ..... H04W 40/24; H04L 12/6418; H04L 12/66
See application file for complete search history.

(56) References Cited

U.S. PATENT DOCUMENTS 9,743,338 B2 * 8/2017 Sung ..................... H04L 12/66
2012/0236739 A1 9/2012 Wang et al.
2013/0205025 A1 8/2013 Shamsee

FOREIGN PATENT DOCUMENTS

CN       102223677 A    3/2010
CN       102868598 A    1/2013

OTHER PUBLICATIONS

International Search Report in International Application No. PCT/IB2014/067442, dated Oct. 12, 2015.
(Continued)

*Primary Examiner* — Siming Liu
(74) *Attorney, Agent, or Firm* — Fisher Broyles LLP; Victoria L. Boyd

(57) ABSTRACT

The present invention discloses methods and network nodes for distributing data packets through a plurality of wide area network (WAN) interfaces and through a gateway at a network node. In order to determine whether the gateway is a slave gateway, identification request is sent to the gateway by a network node. When the gateway is configured as a slave gateway, transmitting instruction to the gateway. Further, weighting may be assigned to the WAN interfaces. Further, connections may be established through WAN interfaces of the network node and WAN interfaces of the gateway. The connections may further be aggregated together to form an aggregated connection.

20 Claims, 22 Drawing Sheets

(51) Int. Cl.
*H04L 12/66* (2006.01)
*H04L 12/24* (2006.01)
*H04W 84/20* (2009.01)
*H04W 88/16* (2009.01)

(52) U.S. Cl.
CPC ......... *H04L 41/0803* (2013.01); *H04W 84/20* (2013.01); *H04W 88/16* (2013.01)

(56) References Cited

OTHER PUBLICATIONS

Written Opinion of the International Searching Authority in International Application No. PCT/IB2014/067442, dated Oct. 12, 2015.

\* cited by examiner

| 1102 | Field 1 | Value 1 | 1106 |
| 1103 | Field 2 | Value 2 | 1107 |
| 1104 | Field 3 | Value 3 | 1108 |
| 1105 | Field 4 | Value 4 | 1109 |

METHODS AND SYSTEMS FOR COMMUNICATIONS THROUGH A SLAVE GATEWAY

RELATED APPLICATION

The present application is a Non-provisional Continuation Application which claims the benefits of and is based on Non-Provisional U.S. patent application Ser. No. 14/889,441 titled "METHODS AND SYSTEMS FOR COMMUNICATIONS THROUGH A SLAVE GATEWAY" filed on 6 Nov. 2015, which claims the benefits of and is based on PCT Application No. PCT/IB2014/067442 titled "METHODS AND SYSTEMS FOR COMMUNICATIONS THROUGH A SLAVE GATEWAY" filed on 31 Apr. 2014, the disclosures of which are hereby incorporated, in their entirety, by these references.

TECHNICAL FIELD

The present invention relates in general to the field of computer networks. More particularly, the present invention discloses methods and systems for transmitting data packets through a plurality of connections and through a gateway, which is capable of being a slave gateway, at a network node.

BACKGROUND ART

Network performance observation is important for determining how to route, distribute and/or forward data through a network. In general, the more detailed and the more updated network performance observations are, the decision of how to route, distribute and/or forward data would be more beneficial to improve overall network performance. For mobile networking, having the most updated and more detailed network performance observations is even more important as mobile networking environment may change very frequently. However, obtaining network performance observations may result in overhead and consume resources.

A network node may obtain network performance observations by monitoring a connection itself. In one alternative, the network node may obtain network performance observations from another network node (gateway), which performs as a gateway for the network node. When the network node observes network performance, it may not be able to have granular observation of the network performance comparing to the observation performed by the gateway. For example, a mobile router acting as a gateway may have signal to noise (SNR) level observation of a wireless channel that the network node cannot observe itself. Therefore, it may be desired to have the gateway reporting network performance observations to the network node frequently and regularly. However, the more frequent network performance observation reports are sent by the gateway, more overhead may be created and more resources may be consumed.

DISCLOSURE OF INVENTION

Summary

According to one of the embodiments of the present invention, if a gateway is configured as a slave gateway, a network node retrieves detailed network performance observation reports (DNPOR) from the gateway; if the gateway is configured not as a slave gateway, the network node retrieves available network performance observation reports (ANPOR) from the gateway. One of the reasons not to request DNPOR from a non-slave gateway is because the non-slave gateway may not be able to provide DNPOR.

In one variant, the network node retrieves DNPOR more frequently than of ANPOR. This may allow network node to have more updated observed network performance.

In one variant, the network node confirms whether the gateway is a slave gateway before retrieving DNPOR from the gateway.

In one variant, the network node observes network performance of a connection, compares its observed network performance against DNPOR, determines the network performance of the connection substantially based on its observed network performance and/or DNPOR retrieved, and then determine weights among the plurality of connections for sending network data.

In one variant, the network node (i) observes network performance of a plurality of connections, retrieves none, one or more DNPORs and, retrieves none, one or more ANPORs, (ii) determines the network performance of the connection substantially based on its observed network performance, and/or DNPOR retrieved, and then (iii) determines weights among the plurality of connections for sending network data.

In one variant, the network node observes network performance of a plurality of connections, compares its observed network performance against one or more DNPOR retrieved, determines the network performance of the plurality of connections substantially based on its observed network performance and/or DNPOR, and then determine weights among the plurality of connections for sending network data.

In one variant, the network node configures the gateway substantially based on the DNPOR if the gateway is confirmed to be a slave gateway.

In one variant, the network node configures the gateway substantially based on the DNPOR and network performance of the plurality of connections if the gateway is confirmed to be a slave gateway.

In one variant, the network node configures the gateway to be a slave gateway if the gateway is not configured as a slave gateway and the gateway is capable of being a slave gateway.

BRIEF DESCRIPTION OF DRAWINGS

FIG. 11 is an illustrative block diagram of a NPOR according to one of the embodiments;

DETAILED DESCRIPTION

Figure 1A:
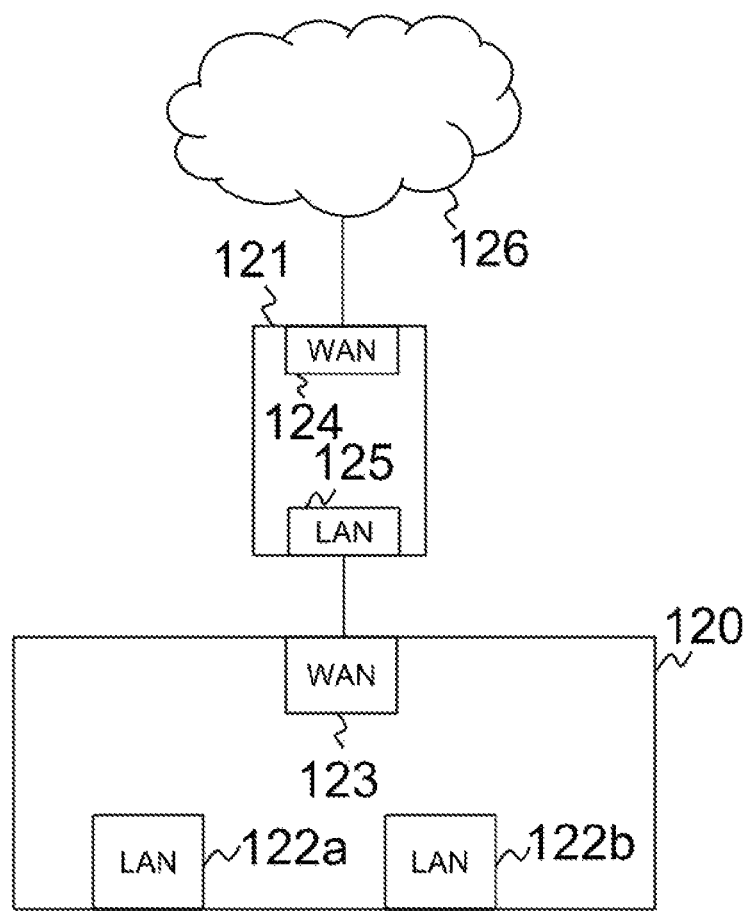
FIG. 1A illustrates a network environment showing connections between one communication apparatus and one gateway according to one of embodiments.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "secondary storage" and Figure US20160353353A1-20161201-P00001 main memory Figure US20160353353A1-20161201-P00002 may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program code, code segments or instruction codes to perform the necessary tasks may be stored in a machine readable medium such as storage medium. A processing unit(s) may perform the necessary tasks. A processing unit(s) can be a CPU, an ASIC semiconductor chip, a semiconductor chip, a logical unit, a digital processor, an analog processor, a FPGA or any processor that is capable of performing logical and arithmetic functions. Also, a processing unit executes program instruction or code segments for implementing embodiments of the present invention. An instruction code may represent a procedure, a function, a subprogram, a program, a routine, a subroutine, a module, a software package, a class, or any combination of instructions, data structures, or program statements. An instruction code may be coupled to another instruction code or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A system bus can be any of several types of bus structures including a memory bus, a peripheral bus, and a local bus using any of a variety of bus architectures.

A network interface may be an Ethernet interface, a fibre optic interface, a cable interface, a serial bus interface, an universal serial bus (USB) interface, etc.

FIG. 1A illustrates one of the network environments according to the present invention. Communication apparatus 120 is connected to gateway 121 via wide area network (WAN) interface 123. Gateway 121 has WAN interface 124. WAN interface 124 may be an Ethernet interface, a USB interface, a serial console interface or any other interface capable of forming a network connection. Then gateway 121 may be wirely connected to interconnected network 126 via WAN interface 124. Since local area network (LAN) interface 125 is connected to WAN interface 123, communication apparatus 120 may connect to interconnected network 126 through gateway 121.

There are myriad choices of physical media and communication protocols that can be used to connect LAN interface 125 and WAN interface 123 for data exchange. For example, LAN interface 125 may connect to WAN interface 123 using an Ethernet cable and Ethernet protocol. In another example, LAN interface 125 may connect to WAN interface 123 using wireless communication technology, such as WiFi. In one example, LAN interface 125 may connect to WAN interface 123 using a USB cable and USB protocol.

Communication apparatus 120 also has LAN interfaces 122 for connecting one or more hosts/network nodes. The number of LAN interfaces 122 is not limited to two. For example, hosts and network nodes may form a LAN with communication apparatus 120 via LAN interfaces 122. LAN interfaces 122 may be a wired LAN interface or a wireless LAN interface. For example, LAN interface 122 *a* can be a wired Ethernet interface and LAN interface 122 *b* can be an IEEE 802.11 based LAN interface.

In one embodiment, processing unit 1301 of communication apparatus 120 will send an identification request to gateway 121 in order to identify gateway 121. Processing unit 1201 of gateway 121 will respond to the identification request if it is operating as a slave gateway or it is capable of operating as a slave gateway but not operating as a slave gateway at that moment. On the other hand, processing unit 1201 of gateway 121 will discard the identification request if it is not capable of operating as a slave gateway as it may not know how to respond to the identification request.

After receiving the identification request, processing unit 1201 of gateway 121 sends an identification confirmation to communication apparatus 120 if it is capable of recognizing an identification request. For example, gateway 121 is operating as a slave gateway or is capable of operating as a slave gateway. After communication apparatus 120 receives the identification confirmation from gateway 121, processing unit 1301 of communication apparatus 120 is then able to recognize that gateway 121 is a slave gateway or capable of being a slave gateway. In another example, when gateway 121 is not capable of operating as a slave gateway, processing unit 1201 of gateway 121 will not send an identification confirmation as processing unit 1201 of gateway 121 does not recognize the identification request.

An identification request and identification confirmation may be implemented in different format, such as using a uniform resource locator (URL), a string, binary data. Also the identification request and identification confirmation may be sent using HTTP protocol, HTTPS protocol, SSH protocol, etc. For illustration purposes only, the identification request may be a HTTP request sent to gateway 121. Processing unit 1201 of gateway 121 replies the HTTP request by sending an HTTP response if gateway 121 is operating as a slave gateway or capable of operating as a slave gateway but not operating as a slave gateway at that moment. The HTTP response sent by gateway 121 will be an identification confirmation. If gateway 121 is not capable of operating as a slave gateway, processing unit 1201 of gateway 121 should not be able to respond to the HTTP request.

The content of an identification request and identification confirmation will be explained in greater detail when discussing about FIG. 2A.

For the present invention, gateway 121 may be operating as a slave gateway, capable of operating as a slave gateway but not operating as a slave gateway at the moment, or not capable of operating as a slave gateway. If gateway 121 is operating as a slave gateway, some or all of networking tasks and configuration may be performed by communication apparatus 120. If gateway 121 is operating as a slave gateway or capable of operating as a slave gateway but not operating as a slave gateway at the moment, communication apparatus 120 may also perform as a provisioning server for gateway 121. There are myriads of examples of how communication apparatus 120 may configure or provision gateway 121. For example, processing unit 1301 of communication apparatus 120 may configure Internet Protocol (IP) address of network interface(s) of gateway 121, such that the administrator or user of gateway 121 does not need to enter IP addresses for gateway 121. In another example, the quality of service parameters of gateway 121 can be configured by processing unit 1301 of communication apparatus 120 to limit one or both of the upload speed and download speed of a WAN interface of gateway 121. In another example, if gateway 121 is capable of operating a Wi-Fi access point, processing unit 1301 of communication apparatus 120 may then provide configuration information, such as service set identification (SSID), captive portal information and channel selection. In another example, when gateway 121 receives a request from a network node, the request may be forwarded by gateway 121 to communication apparatus 120 for processing. Therefore, communication apparatus 120 performs as a master for gateway 121. This may relieve gateway 121 from some of processing tasks and storage for configuration. Further, administrator may configure and manage gateway 121 through communication apparatus 120. This may help the administrator to manage gateway 121 easier than to configure and manage gateway 121 directly.

In one variant, when gateway 121 is capable of operating as a slave gateway but not operating as a slave gateway, processing unit 1301 of communication apparatus 120 will first try to instruct gateway 121 to operate as a slave gateway first before configuring and processing networking tasks for gateway 121. Processing unit 1301 of communication apparatus 120 may send authentication information to gateway 121. Once processing unit 1201 of gateway 121 has authenticated communication apparatus 120, processing unit 1301 of communication apparatus 120 can then send an instruction to gateway 121 to change gateway 121 to a slave gateway, and then start configuring and processing networking tasks for gateway 121.

In one variant, when gateway 121 is not capable of operating as a slave gateway, processing unit 1301 of communication apparatus 120 does not attempt to configure gateway 121 as a slave gateway. Therefore processing unit 1301 of communication apparatus 120 does not configure and process networking tasks for gateway 121.

In one variant, communication protocol used to communicate with a slave gateway is different from communication protocol used to communicate with a non-slave gateway. One of the benefits to use a different communication protocol is to allow using a communication protocol specifically suited for both the communication apparatus and the slave gateway. For example, when gateway 121 is a slave gateway and a mobile router, the size of detailed network performance observations report (DNPOR) may be large and the frequency of sending the DNPORs may be high, it may save bandwidth by sending DNPOR from gateway 121 to communication apparatus 120 using HTTPS with compression.

Figure 1B:
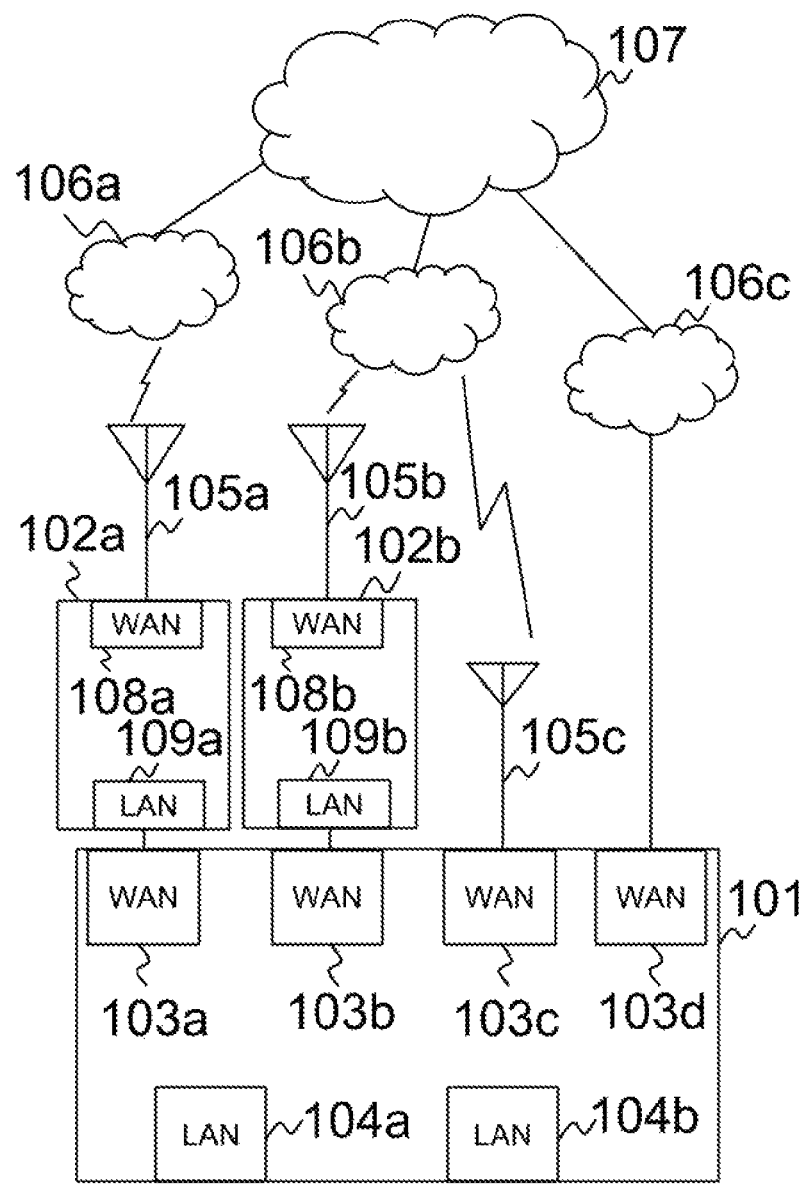
FIG. 1B illustrates a network environment showing connections between one communication apparatus and two gateways according to one of embodiments.

FIG. 1B illustrates one of the network environments according to the present invention. Communication apparatus 101 is connected to two gateways 102*a* and 102*b*. For the present invention, there is no limit to the number of gateways that communication apparatus 101 can connect to. Communication apparatus 101 and gateways 102 are connected via WAN interfaces 103a and 103 b respectively. Gateways 102 may be configured as slave gateways or non-slave gateways. Communication apparatus 101 has WAN interfaces 103c and 103d for connecting to interconnected network 107. WAN interface 103c may be a wireless WAN interface. For illustration purposes, WAN interface 103c may be an embedded third generation (3G) modem and communication apparatus 101 may have a SIM socket for the 3G modem. Then communication apparatus 101 may connect to wireless network 106b through antenna 105 c with the information from a SIM card inserted into the SIM socket. Alternatively WAN interface 103d may be a wired WAN interface. For example, WAN interface 103d may be an Ethernet interface. Then communication apparatus 101 may connect to wireless network 106 c using an Ethernet cable. Those skilled in the art would appreciate that there are myriad methods to implement WAN interface 103d. There is no limitation that the present invention is only applicable to a multi-WAN network node. For example, communication apparatus 101 may only have WAN 103a but not WAN 130b, 103c and 103d. There is also no limitation that the present invention is only applicable to a mobile gateway. For example, gateway 102b may not have antenna 105b and instead using a wired connection to connect to interconnected network 107.

In one embodiment, processing unit 1301 of communication apparatus 101 may collect network performance data from gateways 102 and determine weighting among WAN interfaces based on the collected information. For illustration purposes, when communication apparatus 101 and gateways 102 are manufactured by the same manufacturer, gateways 102 are operating as slave gateways or capable of operating as slave gateways as they are more likely to be compatible. Processing unit 1301 of communication apparatus 101 may collect network performance data from gateways 102. The network performance data may include packet latency, error rates, bit error rates, signal-to-noise ratio, packet error rate, etc. Those skilled in the art would appreciate that there are myriad types of network performance data can be collected from a gateway, such as gateways 102. In addition to information collected from WAN interfaces 103c and 103d, processing unit 1301 of communication apparatus 101 may determine weighting among WAN interfaces 103. So processing unit 1301 of communication apparatus 101 may distribute data according the weighting among WAN interfaces 103. The process on how communication apparatus 101 determines weighting among WAN interfaces will be discussed later.

Those who are skilled in the art would appreciate that network performance of a connection may be referred to performance of an access network, performance of a tunnel, performance of a VPN connection, performance of an end-to-end connection, performance to and/or from a host or network node reachable through the Interconnected networks, such as interconnected networks 107, 126 and 146. Those who are skilled in the art would also appreciate that different methods can be used to determine network performance of different types of connections. For example, the performance of an access network can be based on the information provided by an Ethernet network card or a cellular modem. For VPN connection performance, a ping test carried in the VPN connection can be used to determine or estimate the network performance.

It is to be understood that processing unit 1301 of communication apparatus 101 may be able to identify gateways 102 even though they are not from the same manufacturer. Also, gateways 102 can be configured by communication apparatus 101 using a master-slave profile if processing unit 1301 of communication apparatus 101 is able to identify gateways 102.

Wireless networks 106 may carry one or more network protocol data. Wireless network 106 may be implemented using infrared, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Universal mobile telecommunications system (UMTS); Evolution-Data Optimized (EV-DO); Digital Enhanced Cordless Telecommunications (DECT); Digital AMPS (IS-136/TDMA); Integrated Digital Enhanced (iDEN) or any other wireless technologies. Furthermore, wireless networks 106 may be provided by the same or different Internet Service Providers (ISPs). For example wireless network 106b connected to WAN interface 103c may be provided by Verizon using DSL technology and wireless network 106 c connecting to WAN interface 103d may be provided by Sprint using LTE technology.

Gateway 102a and 102b are able to connect to wireless network 106a and 106b respectively. Gateways 102a, 102b are capable of making cellular connections using UMTS. The cellular connections can be used as WAN connections. Gateways 102a, 102b may have networking interfaces such as Ethernet port, USB local area network (LAN) port and WiFi interface for LAN.

Antenna 105a, 105b are used by gateways 102a, 102b respectively to connect to wireless networks 106a and 106b. Also, gateways 102a and 102b are capable of connecting to interconnected networks 107 through wireless networks 106a and 106b. Therefore, communication apparatus 101 may connect to interconnected network 107 through gateways 102a and 102b.

Communication apparatus 101 has LAN interfaces 104 for connecting to one or more hosts/network nodes. The number of LAN interfaces 104 is not limited to two. For example, hosts and network nodes may form a LAN with communication apparatus 101 via LAN interfaces 104. LAN interfaces 104 may be a wired LAN interface or a wireless LAN interface. For example, LAN interface 104 a can be a wired Ethernet interface and LAN interface 104b can be a IEEE 802.11 based LAN interface.

Figure 2A:
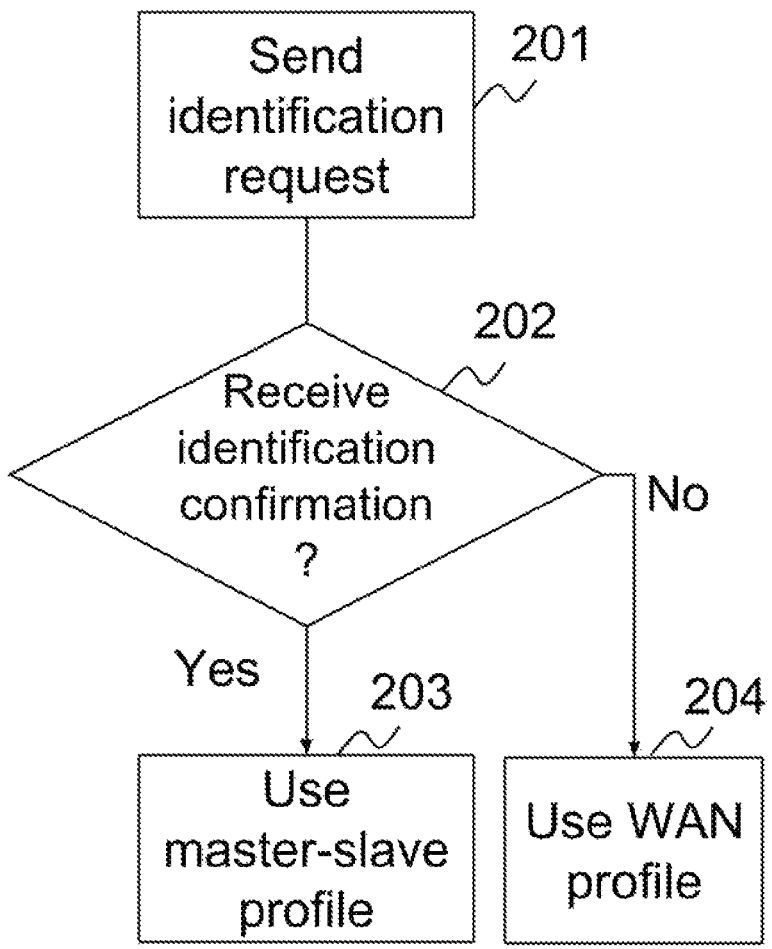
FIG. 2A is a flowchart illustrating a process showing how to identify a gateway using an identification request according to one of the embodiments.

FIG. 2A is a flowchart illustrating one of the embodiments of the present invention. FIG. 2A is viewed in conjunction with FIG. 1A. Communication apparatus 120 sends an identification request to gateway 121 in step 201. In step 202, processing unit 1301 of communication apparatus 120 determines whether an identification confirmation is received from gateway 121. If an identification confirmation is received in step 202, processing unit 1301 of communication apparatus 120 uses a master-slave profile in step 203. Otherwise, if communication apparatus 120 does not receive identification confirmation in step 202, processing unit 1301 of communication apparatus 120 uses a WAN profile in step 204.

In one variant, gateway 121 is capable of being a slave gateway but is not operating as a gateway. When communication apparatus 120 has sent out the identification request and then received an identification confirmation from gateway 121, processing unit 1301 of communication apparatus 120 then verify whether gateway 121 has already been running as a slave gateway. There are myriad methods for processing unit 1301 of communication apparatus 120 to verify whether gateway 121 is a slave gateway. For example, identification confirmation sent by gateway 121 may have a field to indicate whether gateway 121 is already a slave gateway. In another example, an additional message may be sent by gateway 121 proactively or in response to a further request from communication apparatus 120 to inform communication apparatus 120 the status of gateway 121. When processing unit 1301 of communication apparatus 120 determines gateway 121 should be configured as a slave gateway, it will first send instructions to gateway 121 to configure gateway 121 as a slave gateway, then configure gateway 121 to send a DNPOR or ANPOR periodically.

Figure 10A:
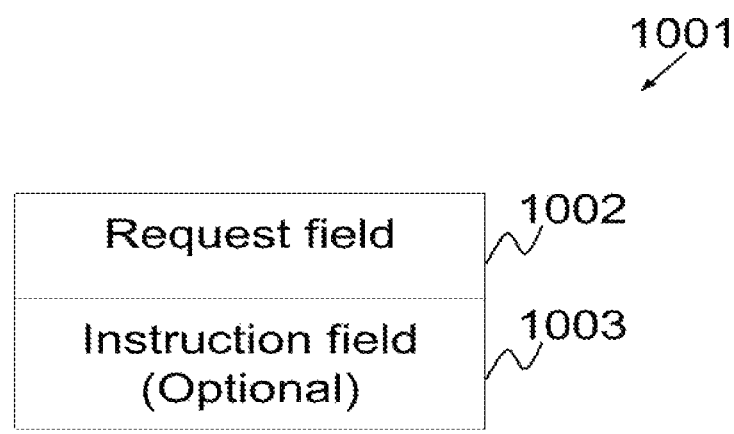
FIG. 10A illustrates the content of an identification request according to one of the embodiments.

FIG. 10A illustrates the content of an identification request encapsulated in a packet according to one of the embodiments of the present invention. Identification request 1001 comprises request field 1002 and an optional instruction field 1003. Request field 1002 may be a predefined string or a code to show that the packet is an identification request. Instruction field 1003 may not be needed if the identification request is only used for identifying whether gateway 121 is a slave gateway or is capable of being a slave gateway. Alternatively, instruction field 1003 is needed when other information is required to assist the identification process. For example, authentication information is stored in instruction field 1003 to allow gateway 121 to determine whether communication apparatus 120 is already authenticated. If the authentication fails, processing unit 1201 of gateway 121 will not respond to the identification request. If the authentication succeeds, processing unit 1201 of gateway 121 will respond with an identification confirmation.

In one variant, after processing unit 1201 of gateway 121 has authenticated communication apparatus 120, processing unit 1301 of communication apparatus 120 may send identification request 1001 with instruction field 1003. For example, instruction field 1003 may be a command to instruct gateway 121 to be a slave gateway. Also, instruction field 1003 may include configurations of gateway 121 such as IP address of network interfaces of gateway 121 so that the administrator or user of gateway 121 does not need to enter IP addresses for one or more network interfaces of gateway 121. Furthermore, instruction field 1003 may be an request for ANPOR or DNPOR. Processing unit 1201 of gateway 121 may send the once or periodically send the information to communication apparatus 120 after receiving the request.

Those skilled in the art would appreciate that there are myriad methods to implement an identification request. In one example, identification request 1001 is sent using an IP packet. The IP packet uses the IP address of communication apparatus 120 as the source address and the IP address of gateway 121 as the destination address. In another example, an identification request is sent through SNMP protocol. Request field 1002 may include a SNMP command and may also include corresponding parameters needed to execute the SNMP command such as IP address of gateway 121 and community string.

Figure 10B:
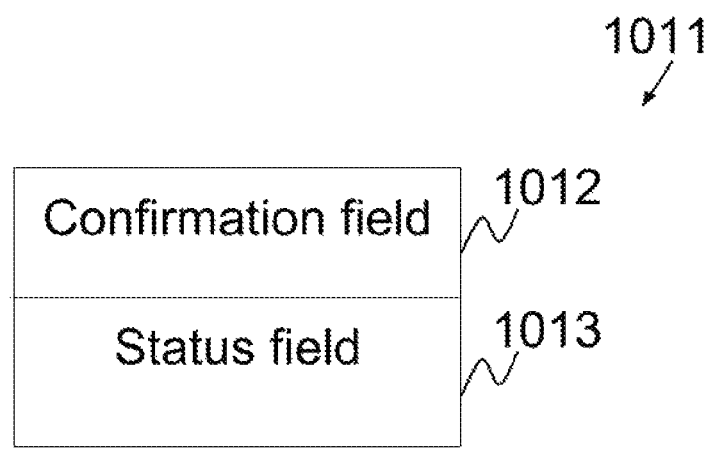
FIG. 10B illustrates the content of an identification confirmation according to one of the embodiments.

FIG. 10B illustrates the content of an identification confirmation according to one of the embodiments of the present invention. Identification confirmation 1011 comprise confirmation field 1012 and status field 1013. There are myriad methods to implement identification confirmation. In one example, identification confirmation 1011 is sent as an IP packet. The IP packet may have the IP address of gateway 121 as the source address and the IP address of communication apparatus 120 as the destination address. The content of confirmation field 1012 is used to show that the packet is an identification confirmation. The content can be a pre-defined string or a code such as "confirmation-identity". Then processing unit 1301 of communication apparatus 120 may recognize that the packet is an identification confirmation if "confirmation-identity" is saved in confirmation field 1012. Alternatively, processing unit 1301 of communication apparatus 120 may recognize the packet is an identification confirmation if a code is saved in confirmation field 1012. Gateway 121 may show its status in status field 1013. For example, status field 1013 may set to a non-zero value if gateway 121 is already a slave gateway. Otherwise, status field 1013 may set to zero.

In another example, processing unit 1201 of gateway 121 may send an identification confirmation through HTTP protocol. Gateway 121 which is capable of being a slave gateway may send an HTTP response with a status code. The IP packet may have the IP address of communication apparatus 120. Confirmation field 1012 and status field 1013 may be represented by the status code. Processing unit 1301 of communication apparatus 120 may know whether gateway 121 is a slave gateway by checking the status code.

FIG. 2A can be further illustrated in conjunction with FIG. 1B. In step 201, communication apparatus 101 sends an identification request to gateway 102a. Processing unit 1301 of Communication apparatus 101 then determines whether an identification confirmation is received in step 202. If an identification confirmation is received in step 202, communication apparatus 101 uses a master-slave profile. Otherwise, if communication apparatus 101 does not receive identification confirmation in step 202, processing unit 1301 of communication apparatus 101 uses a WAN profile.

In one variant, communication apparatus 101 periodically sends out identification requests to gateways 102 in step 201. Gateways 102 may send out identification confirmation periodically to communication apparatus 101 if gateways 102 are a slave gateway or capable of being a slave gateway. In step 201, communication apparatus 101 may send out identification requests to gateway 102a every ten seconds. Then processing unit 1201 of gateway 102a may respond with an identification confirmation. The identification confirmation is then received by communication apparatus 101 in step 202. It would be appreciated that the time interval between each identification request is not limited to ten seconds and it may be in the range from five milliseconds to a few minutes.

A WAN profile may include a set of configurations for processing unit of communication apparatus 101 to configure a WAN interface of communication apparatus 101. One of the benefits of using a profile is that a user is able to perform various configurations using one profile. For example, a WAN profile may include WAN port configurations in which may include connection method, routing mode, IP address, subnet mask, default gateway, DNS servers, band selection, etc.

The connection method may include the dynamic host configuration protocol (DHCP), static IP, etc. When DHCP method is used, the IP address, subnet mask and default gateway of a gateway are configured automatically. When static IP method is used, the IP address, subnet mask and default gateway of the gateway may be predefined values configured by the administrator of the gateway. In one example, WAN interface 103d may be an Ethernet interface. WAN interface 103a may be an universal serial bus (USB) port and is capable of being used as a WAN interface. For example, WAN interface 103a may connect to gateway 102a and gateway 102a can be a USB cellular modem. WAN interface 103a may have the following configurations:

(i) the WAN IP address of communication apparatus 101 corresponding to WAN interface 103a is obtained automatically from a DHCP server.

(ii) the routing mode is configured to the NAT mode.

(iii) DNS server address is obtained automatically.

(iv) the band selection is configured to a auto mode.

Alternatively, WAN interface 103d may have the following configurations:

(i) the WAN IP address of communication apparatus 101 corresponding to WAN interface 103d is set to a static IP address, for example, 1.2.3.4.

(ii) the routing mode is configured to the network address translation (NAT) mode.

(iii) DNS server address is obtained automatically.

A master-slave profile may include a set of configuration information for processing unit of communication apparatus 101 to configure a WAN interface that is connected to a slave gateway and to configure the slave gateway. Those who are skilled in the art would appreciate that the set of configurations can also be considered as provisioning information to provision a gateway to be a slave gateway for the master communication apparatus use. For illustration purpose, gateway 102a is identified as being capable to perform as a slave gateway by communication apparatus 101. Communication apparatus 101 then configures or provisions gateway 102a. The configuration information provides information to processing unit of gateway 102a to configure gateway 102a. The configuration information may include WAN port configurations, LAN port configurations, routing mode, IP address, subnet mask, default gateway, DNS servers, band selection, etc. Depending on the hardware capability and software capability of a gateway, the set of configuration information could be different for different gateways. For example the configuration information provided by communication apparatus 101 to gateway 102a could be different if gateway 102a is equipped with different wireless modems, such as High-Speed Downlink Packet Access (HSDPA) modem or Long-Term Evolution (LTE) modem.

Figure 15:
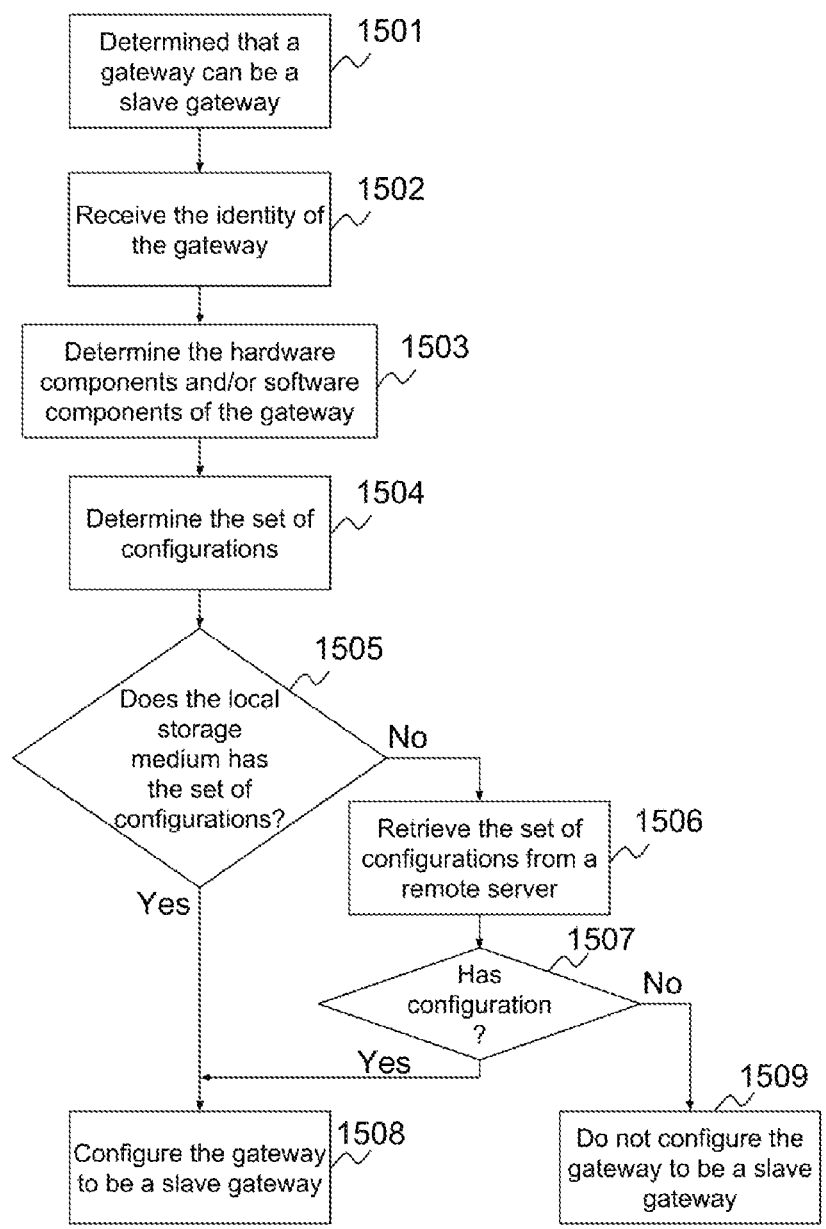
FIG. 15 is a flowchart illustrating a process showing how to configure a slave gateway according to one of the embodiments.

FIG. 15 is a flowchart illustrating a process of one of the embodiments according to the present invention. Communication apparatus 101 determined that gateway 102a can be a slave gateway in step 1501. In step 1502, communication apparatus 101 receives the identity of gateway 102a. Then processing unit 1301 of communication apparatus 101 determines the hardware components and/or software components of gateway 102a in step 1503. For illustration purpose only, the hardware components may be but not limited to the number of WAN and LAN interfaces, the number of embedded modem of gateway 102a. The software components may be but not limited to the firmware version, name of manufacturer of gateway 102a. Based on these components, processing unit 1301 of communication apparatus 101 determines the set of configurations in step 1504. When communication apparatus 101 has identified that gateway 102a can be a slave gateway, processing unit 1301 of communication apparatus 101 verifies whether it has adequate information in secondary storage to configure gateway 102a in step 1505. When there is enough information, processing unit 1301 of communication apparatus 101 retrieves the configuration information from the secondary storage and sends the configuration information to gateway 102a to commence the configuration in step 1508. When there is not enough information, processing unit of communication apparatus 101 may attempt to retrieve the configuration information from a remote server in step 1506. If the remote server provides the configuration information in step 1507, then processing unit 1301 of communication apparatus 101 can store the configuration information in its secondary storage and send the configuration information to gateway 102a to commence the configuration in step 1508. If there is no configuration information or the amount of configuration information is inadequate, processing unit 1301 of communication apparatus 101 will not attempt to configure gateway 102a even gateway 102 is capable of being a slave gateway in step 1509.

In one variant, gateway 102a provides its serial number, hardware component information, and/or software information to communication apparatus 101 and then processing unit 1301 of communication apparatus 101 will determine or retrieve the set of configurations for gateway 102a based, in general, on the serial number, hardware component information, and/or software information. The serial number is used to identify the identity gateway 102a. There is no limitation that a serial number must be used to determine the identity of gateway 102a. Therefore other identity information, such as a string and a number, can be used for determining the identity.

In another variant, communication apparatus 101 may send a request to a remote server in order to retrieve the configuration information for gateway 102a. The remote server is accessible by communication apparatus 101 through interconnected network 107. The request sent from communication apparatus 101 may contain the identity information of gateway 102a. For illustration purpose only, communication apparatus 101 may send a HTTP request to the remote server. The HTTP request may include the serial number of gateway 102a. After receiving the HTTP request, the remote server may look up the set of configurations for gateway 102a based on the serial number. If the remote server has the set of configurations, the remote server may send a HTTP response with the requested set of configurations. If the remote server does not have the set of configurations for gateway 102a, the remote server may send a HTTP response with a status code indicating that no configuration information can be retrieved.

In one variant, the administrator of communication apparatus 101 is a person who has the authority to configure communication apparatus 101 and monitors the activities of communication apparatus 101. The administrator may use a username and password for logging in to an administration user interface (AUI) of communication apparatus 101 and configure communication apparatus 101. For example, the AUI may be accessible through LAN interface of communication apparatus 101, or the WAN interface of communication apparatus 101. The AUI can also be accessible by coupling an interface of a terminal to communication apparatus 101 through a physical medium such as a serial port, a console or a USB port, or mediums such as bluetooth, infrared, etc. For illustration purposes, the configurations of communication apparatus 101 may be shown in the AUI. The configurations may include configurations of WAN interfaces 103 and LAN interfaces 104, service set identification (SSID), web site access, routing policy, VPN connection, etc.

Figure 2B:
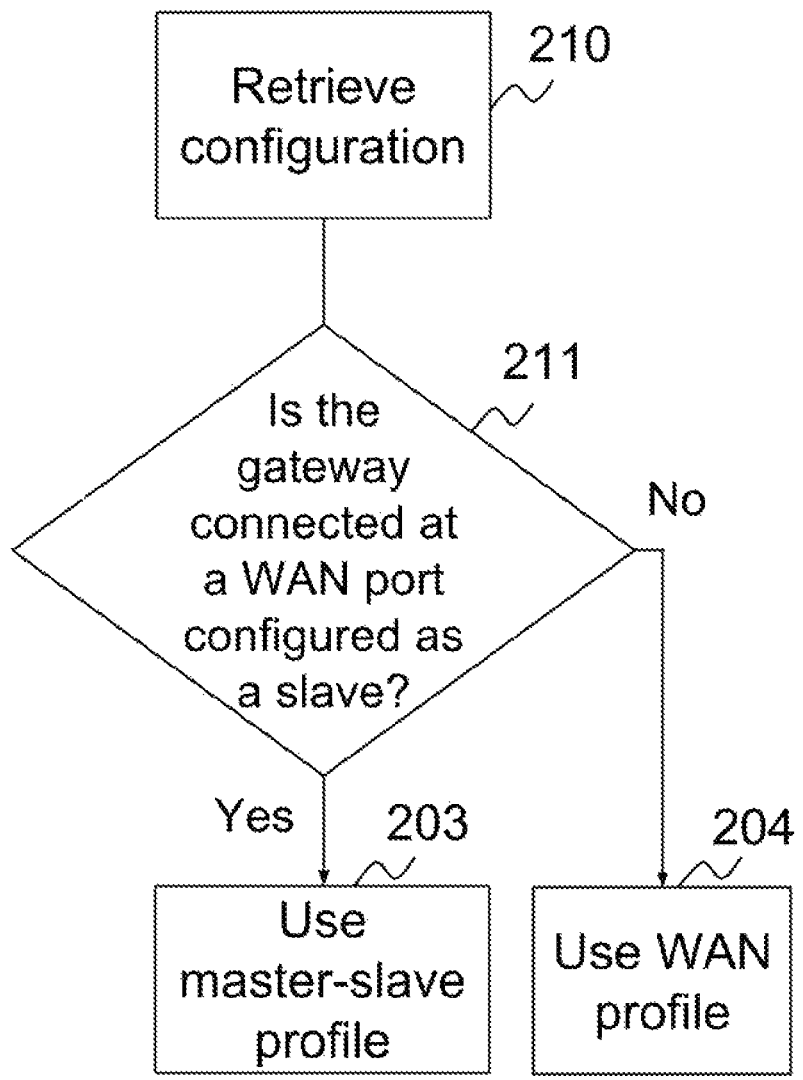
FIG. 2B is a flowchart illustrating a process showing how to identify a gateway using configurations of a communication apparatus according to one of the embodiments.

FIG. 2B is a flowchart illustrating one of the embodiments of the present invention. In step 210, processing unit 1301 of communication apparatus 120 retrieves configurations. The configurations may be predefined by the manufacturer or administrator of communication apparatus 120. The configurations retrieved by processing unit 1301 of communication apparatus 120 may be stored locally or remotely. So processing unit 1301 of communication apparatus 120 may retrieve the configurations from a local storage medium such as secondary storage 1306 or main memory 1302 or may retrieve the configurations from a remote storage medium. According to the configurations, processing unit 1301 of communication apparatus 120 determines whether gateway 121 connected at WAN interface 123 configured as a slave gateway in step 211. If gateway 121 connect at WAN interface 123 which is configured as a slave gateway, processing unit 1301 of communication apparatus 120 may use a master-slave profile in step 203. Otherwise, processing unit 1301 of communication apparatus 120 may use a WAN profile in step 204. For illustration purposes, gateway 121 is connected to communication apparatus 120 via WAN interface 123. Gateway 121 may be configured as a slave gateway. Then processing unit 1301 of communication apparatus 120 may use the master-slave profile and configure gateway 121 accordingly. Alternatively, if gateway 121 is not configured as a slave gateway, processing unit 1301 of communication apparatus 120 may use the WAN profile.

The flowchart illustrated in FIG. 2B can be further illustrated in conjunction with FIG. 1B. In step 210, processing unit 1301 of communication apparatus 101 retrieves configurations. The configurations may be predefined by the manufacturer or administrator of communication apparatus 101. The configurations retrieved by processing unit 1301 of communication apparatus 101 may be stored locally or remotely. Then processing unit 1301 of communication apparatus 101 may retrieve the configurations from a local storage medium such as secondary storage 1306 or main memory 1302 or may retrieve the configurations from a remote storage medium. Based on the configurations, processing unit 1301 of communication apparatus 101 determines whether gateway 102a connected at a WAN port is configured as a slave gateway in step 211. If gateway 102a connect at a WAN port which is configured as a slave gateway, processing unit 1301 of communication apparatus 101 may use a master-slave profile and configure the gateway accordingly in step 203. Otherwise, processing unit 1301 of communication apparatus 101 may use a WAN profile in step 204. For illustration purposes, the administrator of communication apparatus 101 may configure the gateways connecting to WAN interfaces 103a and 103 b as slave gateways. Then processing unit 1301 of communication apparatus 101 may configure gateway 102a using the master-slave profile accordingly. Alternatively, processing unit 1301 of communication apparatus 101 may use the WAN profile to configure gateways connecting to WAN interfaces 103c and 103d.

For the embodiment illustrated in FIG. 2A, an identification request is sent from processing unit 1301 of communication apparatus 120 to gateway 121. Processing unit 1201 of gateway 121 is capable of recognizing the identification request sent by communication apparatus 120 if gateway 121 is a slave gateway or is capable of being a slave gateway. Processing unit 1201 of gateway 121 then sends an identification confirmation to communication apparatus 120 and processing unit 1301 of communication apparatus 120 may configure gateway 121 using the master-slave profile. If no identification confirmation is received by communication apparatus 120, processing unit 1301 of communication apparatus 120 configures gateway 121 using the WAN profile. Comparatively, for the embodiment illustrated in FIG. 2B, processing unit 1301 of communication apparatus 101 may retrieve its configurations to determine whether gateway 121 is configured as a slave or capable of being a slave gateway. If gateway 121 is a slave gateway or capable of being a slave gateway, processing unit 1301 of communication apparatus 101 may use the master-slave profile and configure gateway 121 accordingly. Otherwise, processing unit 1301 of communication apparatus 101 may use the WAN profile and does not configure gateway 121. So communication apparatus 102 may use the retrieved configurations to determine which profile could be used.

Figure 3:
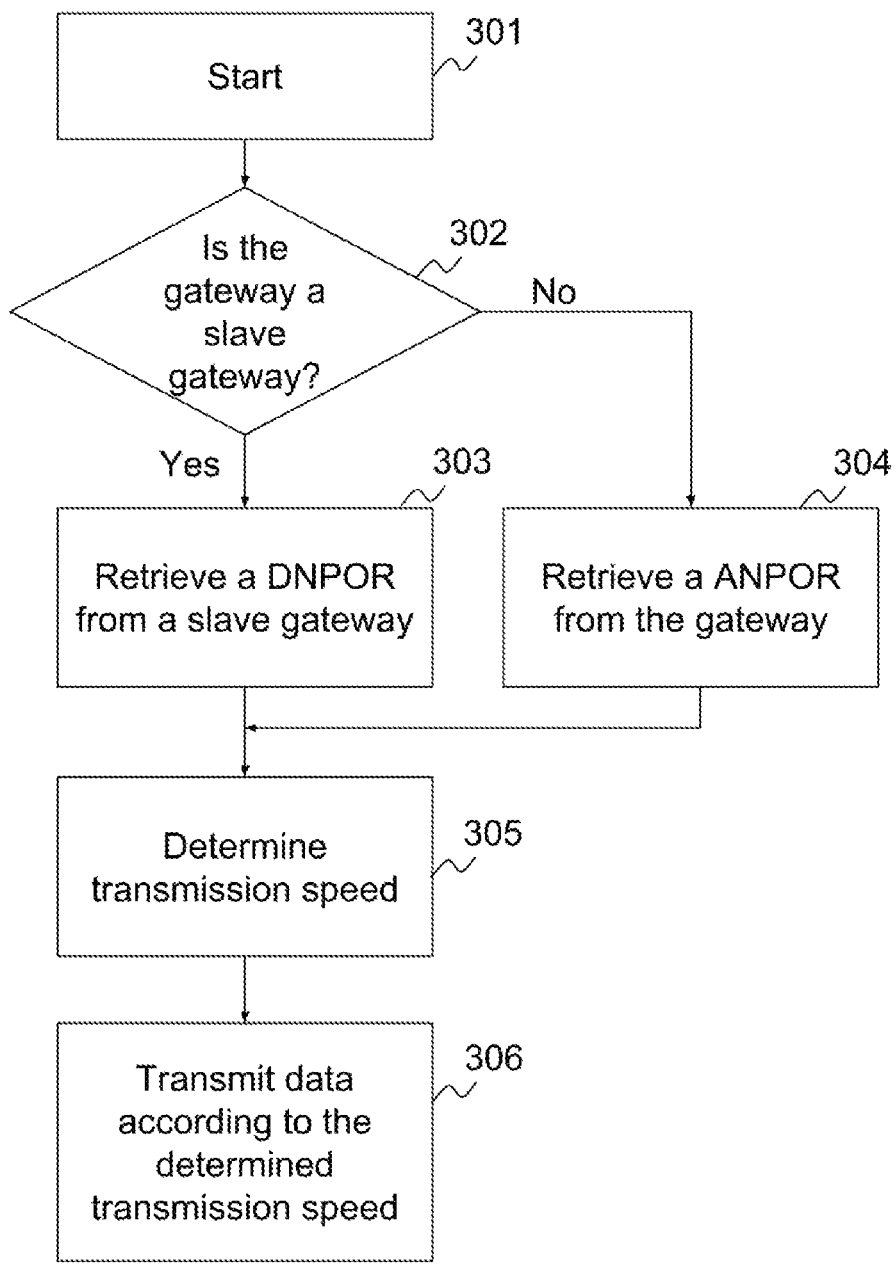
FIG. 3 is a flowchart illustrating a process in which a DNPOR or ANPOR is retrieved by a communication apparatus.

FIG. 3 is a flowchart illustrating a process according to one of the embodiments of the present invention. The process starts in step 301. In step 302, processing unit 1301 of communication apparatus 120 determines whether 121 is a slave gateway. If gateway 121 is operating as a slave gateway, processing unit 1301 of communication apparatus 120 may be able to retrieve a DNPOR from gateway 121 in step 303. Otherwise, processing unit 1301 of communication apparatus 120 may retrieve a ANPOR from gateway 121 in step 304. processing unit 1301 of communication apparatus 120 then determines transmission speed according to the retrieved information in step 305. In step 306, processing unit 1301 of communication apparatus 120 distributes data based mainly on the determined transmission speed. For illustration purposes, Gateway 121 is configured as a slave gateway. Processing unit 1301 of communication apparatus 120 retrieves a DNPOR from gateway 121 in step 303. In step 305, processing unit 1301 of communication apparatus 120 determines transmission speed based on the retrieved DNPOR. In step 306, communication apparatus 120 transmits data according to the determined transmission speed. Alternatively, gateway 121 may not be configured as a slave gateway. Then processing unit 1301 of communication apparatus 120 retrieves ANPOR from gateway 121 in step 303. In step 305, for example, processing unit 1301 of communication apparatus 120 determines transmission speed based on the retrieved ANPOR and transmits data according to the determined transmission speed.

In one variant, processing unit 1301 of communication apparatus 120 may retrieve an ANPOR instead of a DNPOR from a gateway even though the gateway is operating as a slave gateway. For example, gateway 121 is a slave gateway and a mobile router. The size of the DNPOR should be larger that of the ANPOR and the frequency of sending the DNPOR is preferred to be higher than that of the ANPOR. However, in order to save bandwidth available to gateway 121, processing unit 1301 of communication apparatus 120 may retrieve an ANPOR instead of a DNPOR from gateway 121. However, it is preferred to retrieve the DNPOR from gateway 121 as the information provided in the ANPOR is not as detailed as in a DNPOR.

ANPOR is a report comprising of network performance data available by a gateway. The network performance data may be retrieved through SNMP protocol, ICMP protocol or by accessing an internal web page of the gateway. For illustration purposes, the network performance data may be available to a person who may not have any login information of the gateway. For example, the ANPOR may be obtained by pinging a server located in a WAN, such as the Internet. Then the ANPOR may include packet error rate and round trip time only. Alternatively, the network performance data may be available to a person who may have login information of the gateway. For example, the ANPOR may be retrieved through SNMP request in which a community string could be provided. The community string is not a public information and it may be a special code to logging into gateway 121. If the community string is correct, gateway 121 may respond with the requested information. If the community string is incorrect, gateway 121 could discard the request.

In one of the embodiments, DNPOR is a detailed version of ANPOR. Gateway 121 in general provides ANPOR by default. DNPOR is provided when a special request is made to gateway 121 or when gateway 121 is configured to provide DNPOR to one or more specific recipients. A request is considered as a special request if the request is sent by a predefined sender, is authenticated, is sent to a predefined port or address of gateway 121, is embedded with an predefined message, or any other method that allow processing unit 1201 of gateway 121 to recognize the request is a special request.

Network performance observation report (NPOR) is used to store network performance and then sent by a gateway or slave gateway to communication apparatus 101. The report may contain one or a plurality of fields. A field may store one or more network performance value observed by the gateway or slave gateway. A NPOR can be an ANPOR or DNPOR.

FIG. 11 is a illustration block diagram of an exemplary NPOR. NPOR 1101 contains four fields, field 1102 to field 1105, and four values, value 1106 to value 1109. The four values are corresponding to the four fields. Also NPOR 1101 may be in form of, but not limited to string, binary data, Extensible Markup Language (XML) or numerical data. For illustration purposes, processing unit 1201 of gateway 121 may send a ANPOR in the format of NPOR 1101. The ANPOR may include packet error rate, round trip time, firmware version and name of the manufacturer. Then fields 1102-1105 will be packet error rate, round trip time, firmware version and name of the manufacturer respectively. Value 1106 to value 1109 may be, for example, 0%, 3 ms, 6.1.0 and ABC respectively. Those skilled in the art would appreciate that the number of fields and values in a ANPOR is not limited to four. For example, a ANPOR may have two fields such as packet error rate and round trip time. In another example, a ANPOR may have six fields such as packet error rate, round trip time, firmware version, name of manufacturer, serial number and CPU loading.

In one variant, the ANPOR may be encrypted and compressed before it is sent from gateway 121. The size of the ANPOR can be reduced through compression in order to save bandwidth. Also, the information of the ANPOR can be protected by encryption.

In another variant, fields 1102-1105 may have same content but different values. The values of field may be taken at different time interval. For example, processing unit 1201 of gateway 121 may measure its CPU loading every second and it may send a ANPOR every ten seconds. Then, in the ANPOR, fields 1102-1105 are CPU loading and values 1106-1109 will be the values of CPU loading in past ten seconds.

In another variant, a record is comprised with one field and one value. For example, NPOR 1101 is composed of four records. For illustration purpose, the first record is comprised of field 1102 and value 1101. Each record may hold a type of network performance information observed. Alternatively, each record may hold network performance information observed at one particular time.

DNPOR is a report comprising of detailed network performance data available by a slave gateway. The DNPOR may be retrieved through various methods. For illustration purposes, communication apparatus 120 has authentication information required for logging into gateway 121, which is operating as a slave gateway and for retrieving DNPOR from gateway 121. The DNPOR may be available only to a person or device who is authorized to access the data. For example, communication apparatus 120 may be given a username and password so that communication apparatus 120 may be able to access gateway 121 through SSH protocol. The DNPOR may include quality of service information, bandwidth information, number of VPN connections, bit error rate, packet error rate, etc. Furthermore, if gateway 121 is a mobile gateway that uses a cellular modem, signal-to-interface ratio and signal-to-noise ratio observed by the cellular modem may also be included in the DNPOR.

In another example, processing unit 1301 of communication apparatus 120 may retrieve the DNPOR without logging into the slave gateway. For example, the slave gateway may determine whether to send the DNPOR based on the source IP address of a request. The slave gateway may be configured to send the DNPOR if the source IP address of the request for DNPOR is from an IP address. Those who are skilled in the art would appreciate that the it is not limited to use source IP address. The slave gateway may use other information to identify communication apparatus 120 such as hostname, MAC address, etc, such that processing unit 1301 of communication apparatus 120 may retrieve the DNPOR from the slave gateway as long as the slave gateway is able to identify communication apparatus 120. It is to be understood that the DNPOR may provide more network performance data than that of ANPOR as the DNPOR may be available to an authorized person only.

The format of DNPOR could be the same as the format of ANPOR. A DNPOR can also be presented in the format of NPOR 1101. For illustration purpose, the DNPOR may include number of VPN connections, packet error rates, packet latency, CPU loading and signal-to-noise ratio, etc. Then fields 1102-1105 may be number of VPN connections, packet error rates, packet latency and CPU loading. Values 1106-1109 may be the value of number of VPN connections, packet error rates, packet latency and signal-to-noise ratio. Since the number of network performance data is not limited to four, NPOR 1101 will have additional field and value to store signal-to-noise ratio. In one variant, the DNPOR may be encrypted and compressed before it is sent from gateway 121.

Figure 4A:
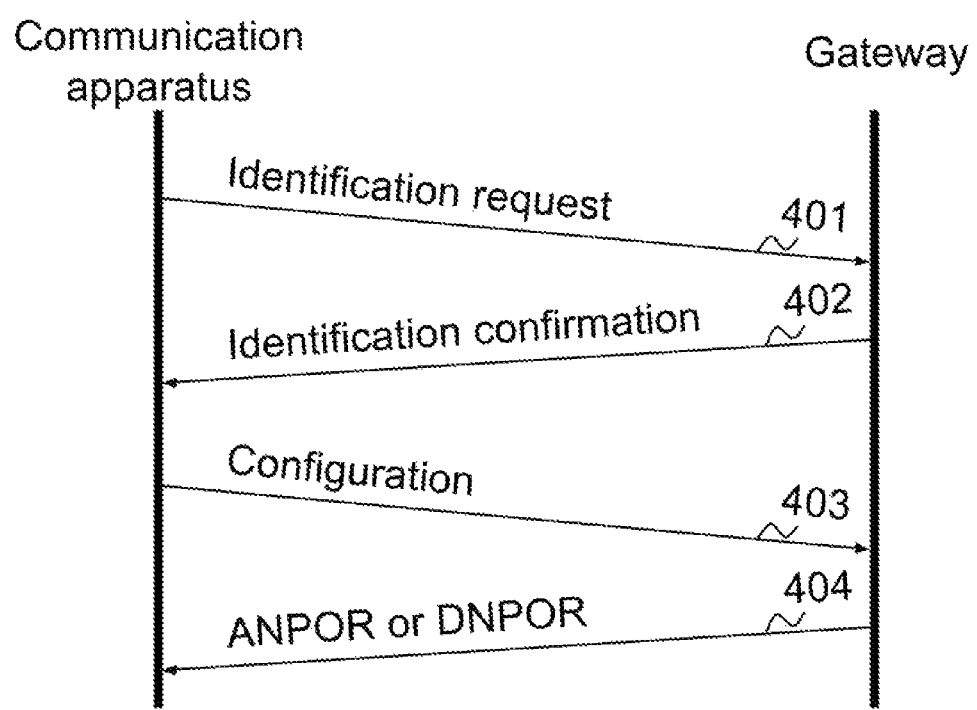
FIG. 4A is a sequence diagram illustrating communications between a communication apparatus and a gateway according to one of the embodiments.
Figure 4B:
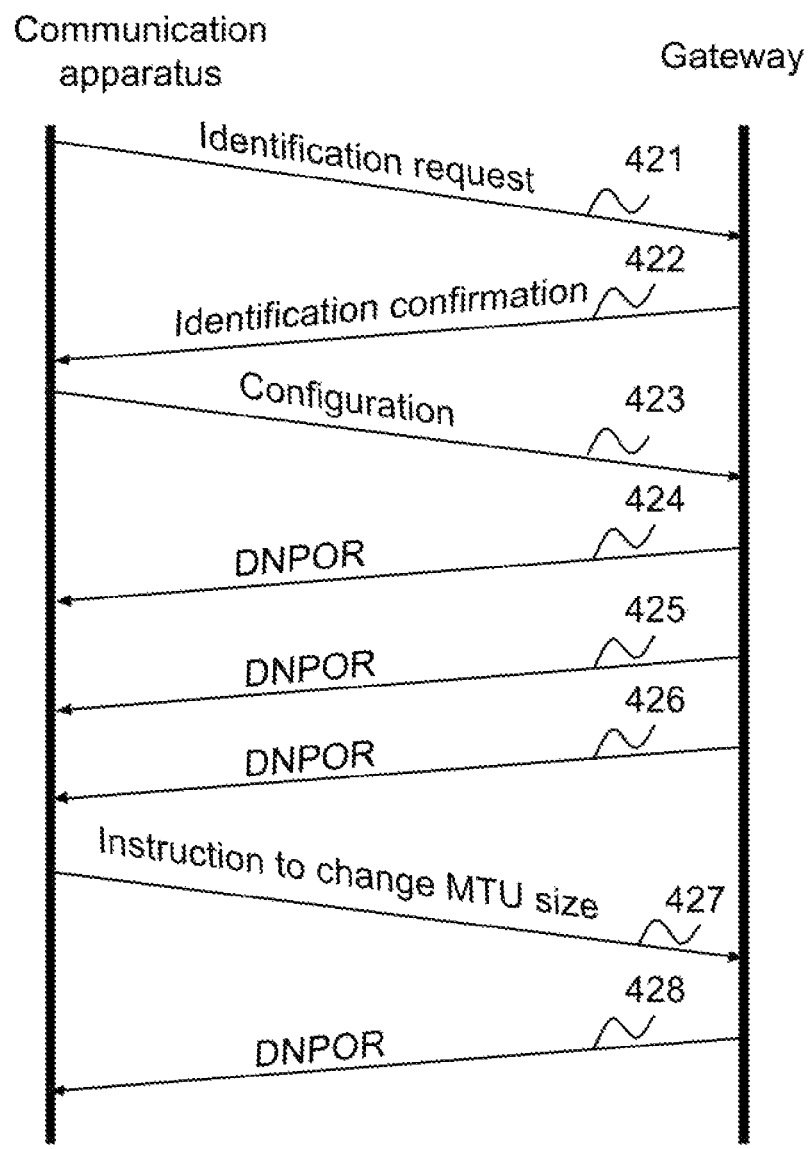
FIG. 4B is a sequence diagram illustrating communications between a communication apparatus and a gateway according to one of the embodiments.

FIG. 4B illustrates a process on how gateway 121 could send a DNPOR to communication apparatus 120. Processing unit 1301 of communication apparatus 120 sends an identification request to gateway 121 in step 421. Processing unit 1201 of gateway 121 will send an identification confirmation in step 422 if gateway 121 is operating as a slave gateway or capable of being a slave gateway but not operating as a slave gateway. After receiving an identification confirmation from gateway 121, processing unit 1301 of communication apparatus 120 will then send an instruction to configure gateway 121 as a slave gateway in step 423. In one variant, processing unit 1301 of communication apparatus 120 may not perform step 423 even though it receives an identification confirmation from gateway 121 if gateway 121 is already operating as a slave gateway. Processing unit 1201 of gateway 121 may periodically send the DNPOR to communication apparatus 120 starting from step 424. In one variant, the content of the DNPOR and the frequency of sending the DNPOR may depend on the configurations of gateway 121 or instructions sent by processing unit 1301 of communication apparatus 120. In one example, processing unit 1301 of communication apparatus 120 may request packet error rate, CPU loading and packet latency to be included in DNPOR from gateway 121. Then all of the DNPORs sent in steps 424, 425, 426 and 428 will include these three fields and values. In another example, the DNPORs sent in steps 424, 425, 426 and 428 may only include firmware version, packet error rate, CPU loading and packet latency respectively. In another variant, processing unit 1301 of communication apparatus 120 may configure gateway 121 by sending an instruction to gateway 121.

For example, processing unit 1301 of communication apparatus 120 instructs gateway 121 to change the size of maximum transmission unit (MTU) into 1440 bytes in step 427. Then processing unit 1201 of gateway 121 may send data with the new MTU value. In another variant, processing unit 1201 of gateway 121 may continue to send the DNPOR in step 428 until a further instruction is sent from processing unit 1301 of communication apparatus 120.

In one variant, processing unit 1301 of communication apparatus 120 may retrieve the DNPOR more frequently than that of the ANPOR. For illustration purposes, communication apparatus 120 may connect to gateway 121 and gateway 121 may be configured as a slave gateway. Also, processing unit 1301 of communication apparatus 120 may periodically retrieve the DNPOR from gateway 121. For example, processing unit 1301 of communication apparatus 120 may retrieve the DNPOR from gateway 121 every ten seconds. Processing unit 1301 of communication apparatus 120 may then determine the transmission speed every ten seconds. On the other hand, gateway 121 may not be configured as a slave gateway. Then processing unit 1301 of communication apparatus 120 may retrieve the ANPOR from gateway 121 and may determine the transmission speed every twenty seconds. Since the more information are retrieved from gateway 121, the more overhead may be created and more resources may be used. Also, the ANPOR may provide less information compared with the DNPOR. So it is to be understood that the ANPOR may be retrieved in a less frequent manner in order to reduce overhead and save resources. Though communication apparatus 120 may retrieve the DNPOR more frequently than that of ANPOR, the frequency of retrieving DNPOR may be limited by the resources available by gateway 121.

In another variant, processing unit 1301 of communication apparatus 120 may retrieve the DNPOR less frequently than that of the ANPOR. The frequency of retrieving the ANPOR may be higher than that of retrieving the DNPOR. For illustration purposes, processing unit 1301 of communication apparatus 120 may retrieve the ANPOR every twenty seconds and retrieve the DNPOR every ten seconds. However, the information provided by ANPOR may not adequate to determine the transmission speed in step 305 if processing unit 1301 of communication apparatus 120 retrieve the ANPOR every twenty seconds. Also, communication apparatus 120 may reluctant to retrieve the DNPOR from gateway 121 as the resources available to gateway 121 may be limited. As a result, processing unit 1301 of communication apparatus 120 may retrieve the ANPOR from gateway 121 every five seconds instead of twenty seconds.

The flowchart illustrated in FIG. 3 can be viewed in conjunction with FIG. 1B. For illustration purposes, communication apparatus 101 may have multiple WAN interfaces. It may connect to gateway 102a and gateway 102a may be operating as a slave gateway in step 302. Then processing unit 1301 of communication apparatus 101 retrieves a DNPOR from gateway 102a in step 303. In step 305, processing unit 1301 of communication apparatus 101 determines the transmission speed based on the retrieved DNPOR. In step 306, processing unit 1301 of communication apparatus 101 distributes data according to the determined transmission speed. Alternatively, gateway 102a connecting to communication apparatus 101 may not be a slave gateway in step 302. Then processing unit 1301 of communication apparatus 101 retrieves ANPOR from the gateway in step 304.

FIG. 4A illustrates a process according to one of of the embodiments of the present invention. Processing unit 1301 of communication apparatus 120 sends an identification request to gateway 121 in step 401. Since gateway 121 is operating as a slave gateway or capable of being a slave gateway 121, it sends an identification confirmation to communication apparatus 120 in step 402. The identification confirmation may have a field, such as status field 1013, to indicate whether gateway 121 is already operating as a slave gateway or capable of being a slave gateway. If gateway 121 is capable of operating as a slave gateway but not operating as a slave gateway, processing unit 1301 of communication apparatus 120 may configure gateway 121 as a slave in step 403. If gateway 121 is already operating as a slave gateway, processing unit 1301 of communication apparatus 120 instructs gateway 121 to send a ANPOR or DNPOR. So if gateway 121 is operating as a slave gateway, gateway 121 will send the ANPOR or DNPOR in step 404.

The process illustrated in FIG. 4A can be viewed in conjunction with FIG. 1B. For illustration purposes, processing unit 1301 of communication apparatus 101 sends identification requests to gateways 102 in step 401. Gateway 102a is capable of being a slave gateway but gateway 102b is not. Then processing unit 1201 of gateway 102a sends an identification confirmation to communication apparatus 101 in step 402. Also, processing unit 1301 of communication apparatus 101 starts to configure gateway 102a in step 403. In step 404, gateway 102a is operating as a slave gateway and sends a DNPOR or ANPOR to communication apparatus 101. On the other hand, gateway 102b is not capable of being as a slave gateway. Then processing unit 1201 of gateway 102b may send the ANPOR to communication apparatus 101.

Figure 9:
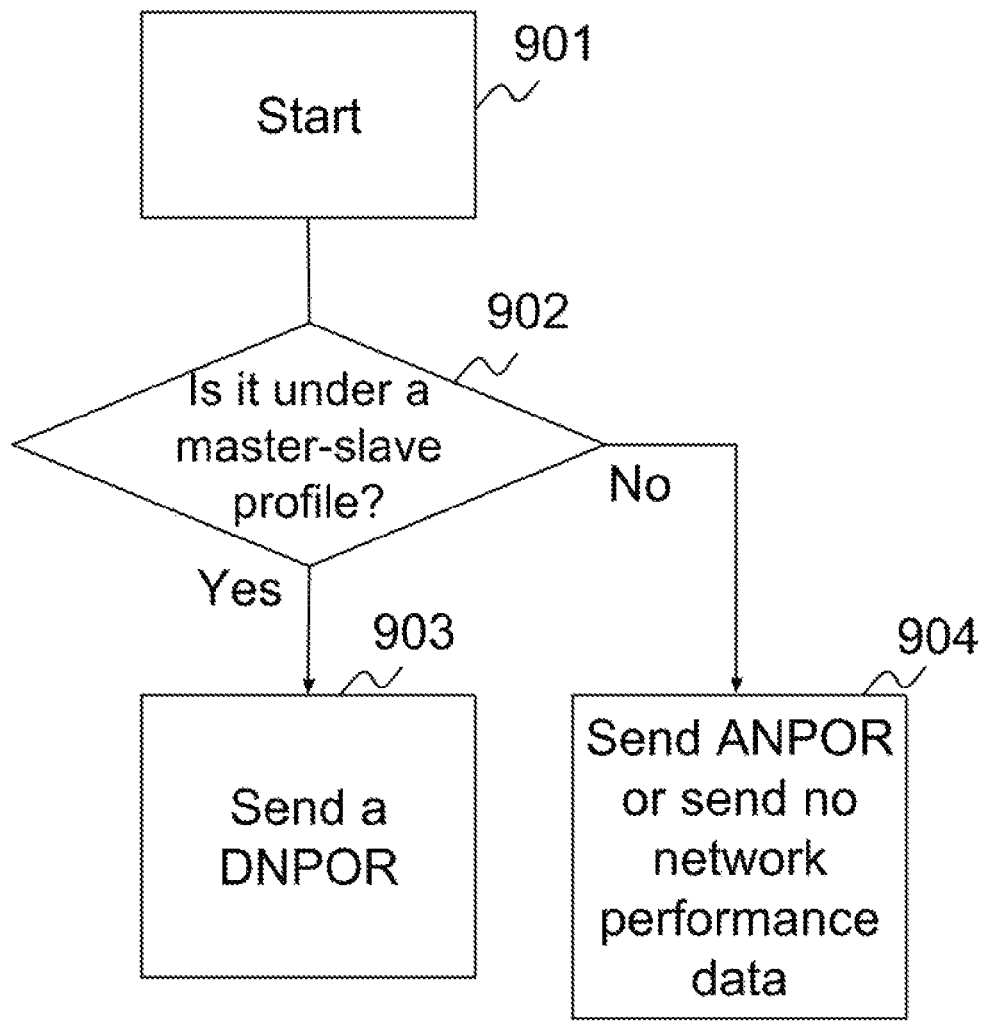
FIG. 9 is a flowchart illustrating a process in which a DNPOR or ANPOR is sent from a slave gateway.

In one variant, communication apparatus 120 may receive a DNPOR or ANPOR from gateway 121 instead of retrieving a DNPOR or ANPOR from gateway 121. FIG. 9 is an illustration showing an embodiment of an gateway side process.

Figure 5:
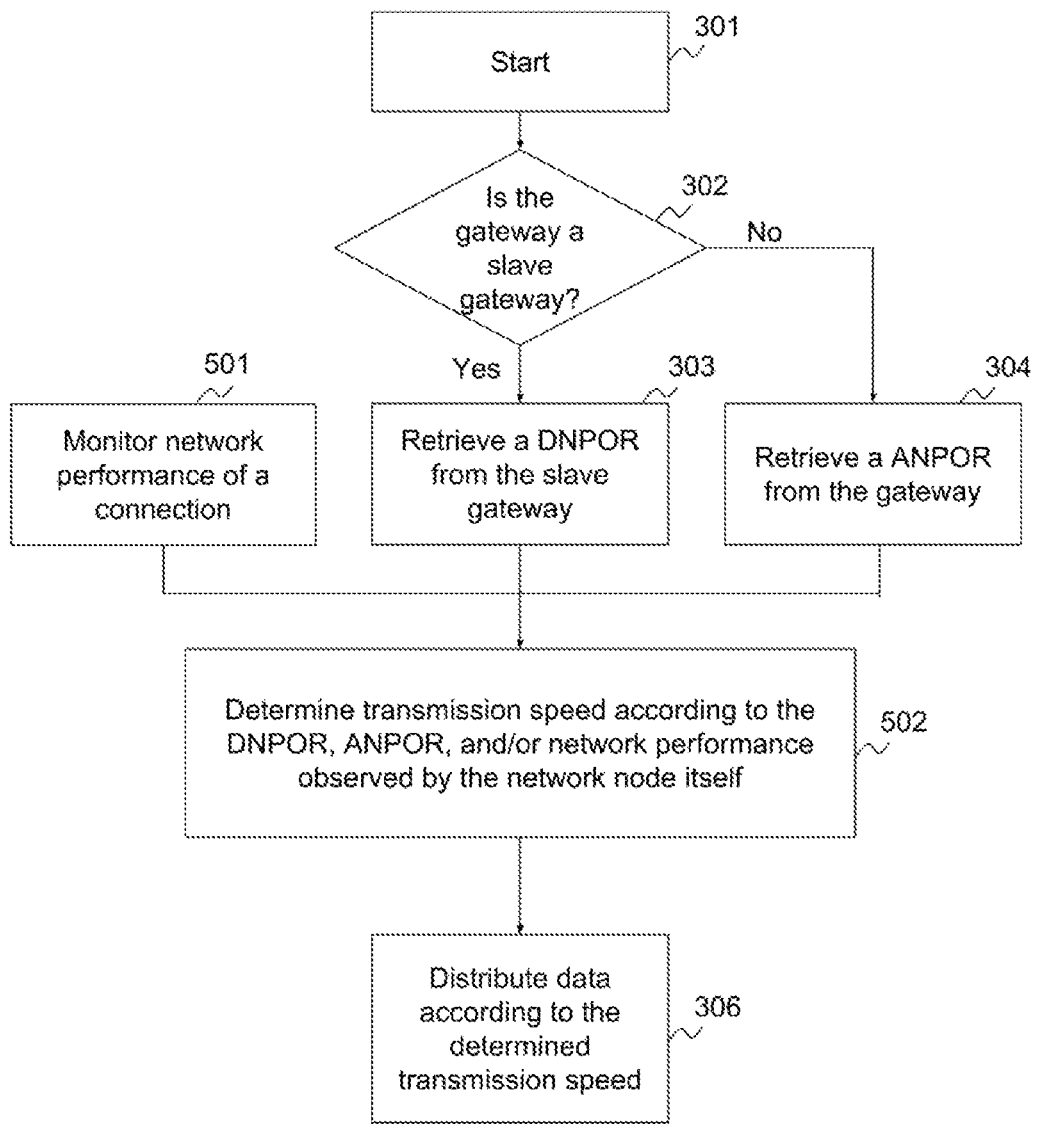
FIG. 5 is a flowchart illustrating a process in which the transmission speed is determined based on network performance of one connection, DNPOR or ANPOR of one gateway according to one of the embodiments.

FIG. 5 is a flowchart illustrating a process according to one of the embodiments of the present invention. The process starts in step 301. Processing unit 1301 of communication apparatus 120 determines whether the gateway is a slave gateway in step 302. If the gateway is a slave gateway, processing unit 1301 of communication apparatus 120 retrieves a DNPOR from the slave gateway in step 303. Otherwise, processing unit 1301 of communication apparatus 120 retrieves a ANPOR from the gateway in step 304. In step 501, communication apparatus 120 monitors the network performance of a connection. In step 502, processing unit 1301 of communication apparatus 120 determines the transmission speed according to the retrieved DNPOR or ANPOR and the observed network performance in step 501. In step 306, processing unit 1301 of communication apparatus 120 distributes data according to the determined transmission speed. For illustration purposes, gateway 121 may connected to communication apparatus 120 and gateway 121 may be configured as a slave gateway. Processing unit 1301 of communication apparatus 120 may retrieve DNPOR from gateway 121 in step 303. Also communication apparatus 120 may monitor the network performance from a connection in step 501. Then processing unit 1301 of communication apparatus 120 may determine the transmission speed by comparing the retrieved DNPOR and the observed network performance. As a result, processing unit 1301 of communication apparatus 120 may distribute data according to the determined transmission speed.

The flowchart illustrated in FIG. 5 can be viewed in conjunction with FIG. 1B. Communication apparatus 120 may have multiple WAN interfaces and it may connect to more than one gateways. For illustration purposes, communication apparatus 101 has multiple WAN interfaces. Processing unit 1301 of communication apparatus 101 determines whether the gateway is a slave gateway in step 302. If the gateway is a slave gateway, processing unit 1301 of communication apparatus 101 retrieves a DNPOR from the slave gateway in step 303. Otherwise, processing unit 1301 of communication apparatus 101 retrieves a ANPOR from the gateway in step 304. In step 501, communication apparatus 101 monitors the network performance of a connection. In step 502, processing unit 1301 of communication apparatus 101 determines the transmission speed according to the retrieved DNPOR or ANPOR and the observed network performance in step 501. In step 306, processing unit 1301 of communication apparatus 101 distributes data according to the determined transmission speed. In one example, communication apparatus 101 may connect to gateway 102a which may be configured as a slave gateway. Processing unit 1301 of communication apparatus 101 may retrieve a DNPOR from gateway 102a in step 303. Also, communication apparatus 101 may monitor network performance from a connection in step 501. Then processing unit 1301 of communication apparatus 101 may determine the transmission speed by comparing retrieved DNPOR and the observed network performance. As a result, processing unit 1301 of communication apparatus 101 may distribute data according to the determined transmission speed.

Figure 6:
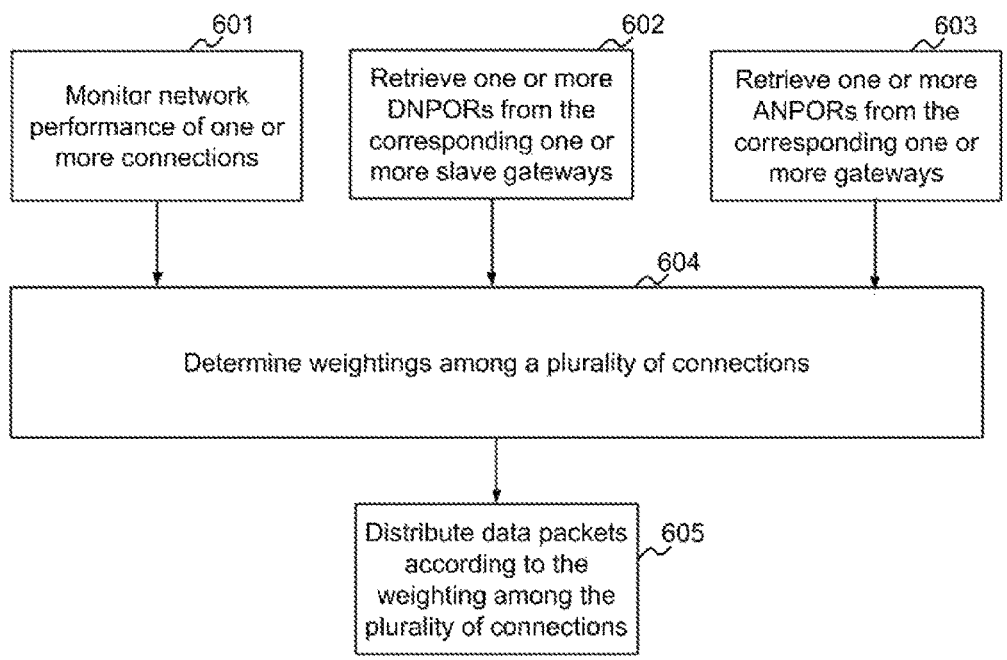
FIG. 6 is a flowchart illustrating a process in which the weighting is determined based on network performance of one or more than one connections, DNPORs and ANPORs of one or more than one gateways according to one of the embodiments.

FIG. 6 is a flowchart illustrating process of one of the embodiments according to the present invention. When processing unit 1301 of communication apparatus 101 determines weightings at step 604 for distributing data packets among the plurality of connections at step 605, the weightings are calculated based on network performances observed for the plurality of connections. The network performances observed can be estimated by processing unit 1301 by monitoring network performance of one of more connections at step 601, by retrieving one or more DNPORs from the corresponding one or more slave gateways connected to communication apparatus 101 that the connections pass through at step 602, and by retrieving one or more ANPORs from the corresponding one or more slave gateways connected to communication apparatus 101 that the connections pass through at step 603. The more detailed and the more frequent network performance observations are available, processing unit of the communication apparatus has more accurate information to determine the appropriate weightings among the plurality of connections. For example, processing unit of the communication apparatus may choose a connection among all the plurality of connections that has the lowest latency to transmit voice over IP data packets. In another example, processing unit of the communication apparatus may distribute Hypertext Transfer Protocol (HTTP) and Hypertext Transfer Protocol Secure (HTTPS) requests among the all the plurality of connections according to the available bandwidth at each of the connections. There is no limitation that all the network performances must be observed at the same time. For example step 601 may be performed at about 10 seconds earlier than steps 602 and 603. It is preferred that steps 601, 602 and 603 are performed within five seconds, especially for mobile networks. The DNPORS and ANPORS should be as updated as possible in order to reflect more current network performances.

For the network environment illustrated in FIG. 1A, communication apparatus 120 only has one WAN interface 123 and gateway 121 only has one WAN interface 124. There can be a plurality of connections established between communication apparatus 120 and other hosts and network nodes through WAN interface 123 and WAN interface 124. The network performance observations can be performed on each connection. Gateway 121 creates the DNPORs and/or ANPORs for one or more of the connections. Communication apparatus 120 then receives the DNPORs and/or ANPORs from gateway 121 respectively at step 602 or 603.

For the network environment illustrated in FIG. 1B, communication apparatus 101 has four WAN interfaces 103 and gateways 102a and 102b both have one WAN interface each. There can be a plurality of connections established between communication apparatus 120 and other hosts and network nodes through WAN interfaces 102a, 102b, 103a, 103 b, 103c and 103d. The network performance observations can be performed on each connection. Gateways 102a and 102b create the DNPORs and/or ANPORs for one or more of the connections passing through it respectively. Communication apparatus 120 then receives the DNPORs and/or ANPORs from gateways 102a and 102b respectively. For network performances of connection established via WAN interfaces 103c and 103d, processing unit of communication apparatus 101 monitors the network performances by itself.

Figure 7:
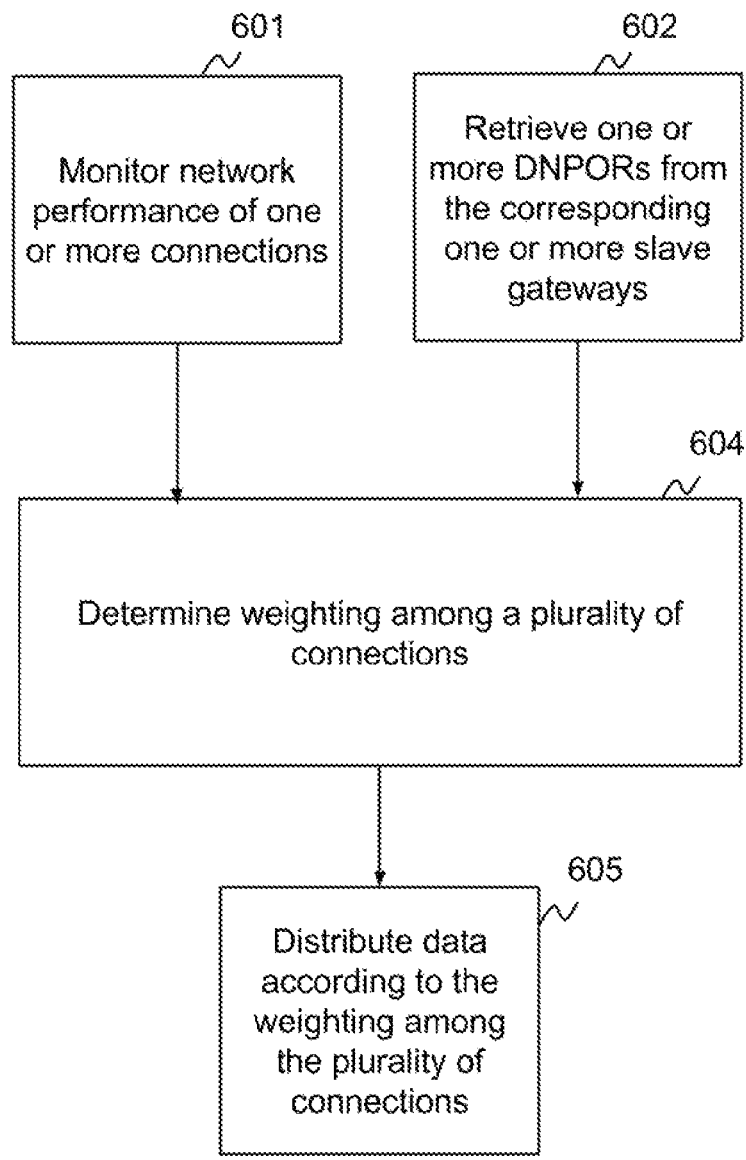
FIG. 7 is a flowchart illustrating a process in which the weighting is determined based on network performance of one or more than one connections and DNPORs of one or more than one gateways according to one of the embodiments.

FIG. 7 is a flowchart illustrating process of one of the embodiments according to the present invention. Comparing to the flowchart illustrated in FIG. 6, step 603 is omitted in FIG. 7. Using the network environment in FIG. 1B as an illustration, for illustration purpose, gateway 102a is a slave gateway and gateway 102b is not a slave gateway. Gateway 102b is not used by communication apparatus 101 for transmitting data packets to Interconnected networks 107 as gateway 102b is not capable of sending DNPORs to communication apparatus 101. When processing unit of communication apparatus 101 is not capable of estimating network performance without DNPORs, it does not use WAN interface 103, which connects to gateway 102b for transmitting data packets to Interconnected networks 107. In one variance, gateway 102b is not a slave gateway but is capable of providing communication apparatus 101 with DNPORs, processing unit of communication apparatus 101 uses WAN interface 103 b.

Figure 8:
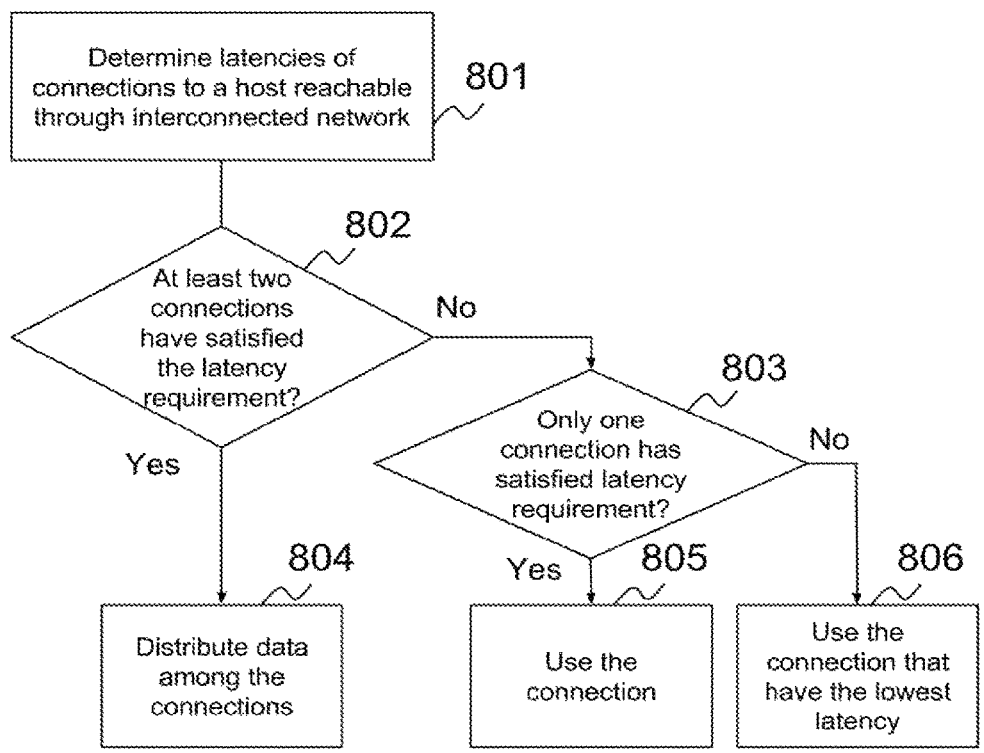
FIG. 8 is a flowchart illustrating a process in which the weighting is determined based on the latency information of the slave gateway according to one of the embodiments.

FIG. 8 is a flowchart illustrating a process of one of the embodiments according to the present invention. The flowchart can be viewed in conjunction with FIG. 1B. In step 801, processing unit 1301 of communication apparatus 101 determines latencies of connections to a host reachable through interconnected network. The latencies of connections can be collected from gateways 102 as gateways 102 are connected to communication apparatus 101 via WAN interfaces 103a and 103 b. Furthermore, processing unit 1301 of communication apparatus 101 determines the latency information for connections that established via WAN interfaces 103c and 103d. If there are at least two connections satisfied the latency requirement in step 802, communication apparatus 101 distributes data among the connections in step 804. Alternatively, if there is only one or no connection satisfied the latency requirement in step 802, processing unit 1301 of communication apparatus 101 determines whether there is only one connection satisfied the latency requirement in step 803. If there is only one connection satisfied the latency requirement in step 803, communication apparatus 101 uses the connection in step 805. If there is no connection satisfied the latency requirement in step 803, communication apparatus 101 uses a connection which has the lowest latency in step 806.

Figure 12A:
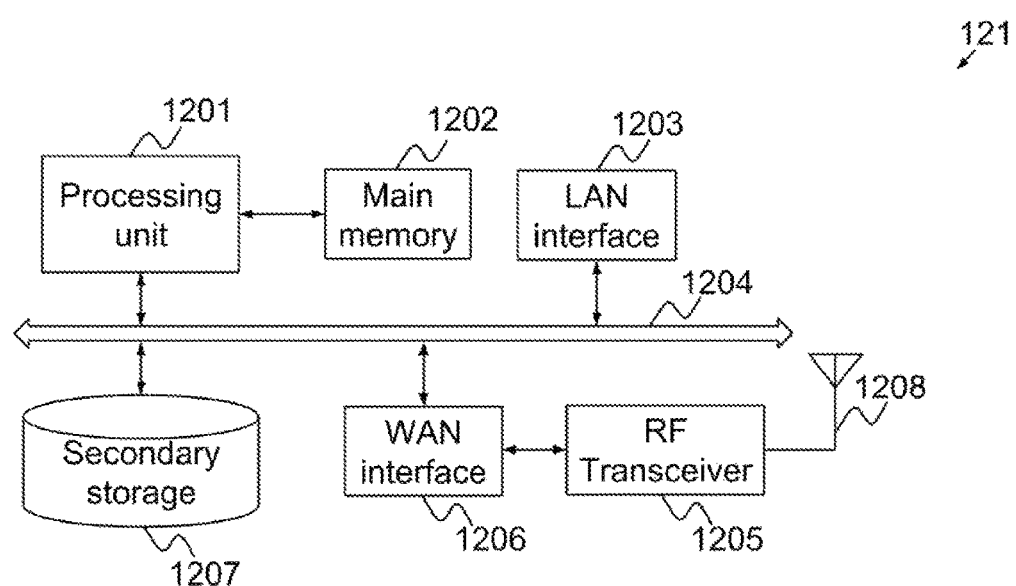
FIG. 12A is an illustrative block diagram of a gateway according to one of the embodiments.

FIG. 12A illustrates one of the embodiments of gateway 121 according to the present invention.

For readability, discussion below about gateway 121 also applies to gateways 120a and 120b. Gateway 121 comprises processing unit 1201, main memory 1202, LAN interface 1203, system bus 1204, RF transceiver 1205, WAN interface 1206, secondary storage 1207 and antenna 1208. Processing unit 1201 and main memory 1202 are connected with each other directly. WAN interface 1206 and RF transceiver 1205 can be connected or coupled with each other directly. In one variant, RF transceiver 1205 may act a WAN interface. For illustration purposes, RF transceiver 1205 may be an embedded 3G modem, then WAN interface 1206 may not be needed.

LAN interface 1203 is connected to processing unit 1201 via system bus 1204. LAN interface 1203 corresponds to LAN interface 125 or LAN interfaces 109. Hosts or network nodes may form a LAN with gateway 121 via LAN interface 1203.

System bus 1204 connects processing unit 1201 directly or indirectly to LAN interface 1203, WAN interface 1206 and secondary storage 1207. Using system bus 1204 allows gateway 121 to have increased modularity.

RF transceiver 1205 is connected to WAN interface 1206 and antenna 1208. RF transceiver 1205 is capable of transmitting data received from WAN interface 1206 to a base station through antenna 1208. Furthermore, gateway 121 is capable of receiving data originated from a base station through antenna 1208, RF transceiver 1205 and WAN interface 1206. Therefore, Gateway 121 is capable of connecting to a access network through WAN interface 1206, RF transceiver 1205 and antenna 1208.

Antenna 1208 is connected directly or coupled to RF transceiver 1205. Antenna 1208 is used to transmit and receive electrical signal to and from a base station.

Figure 12B:
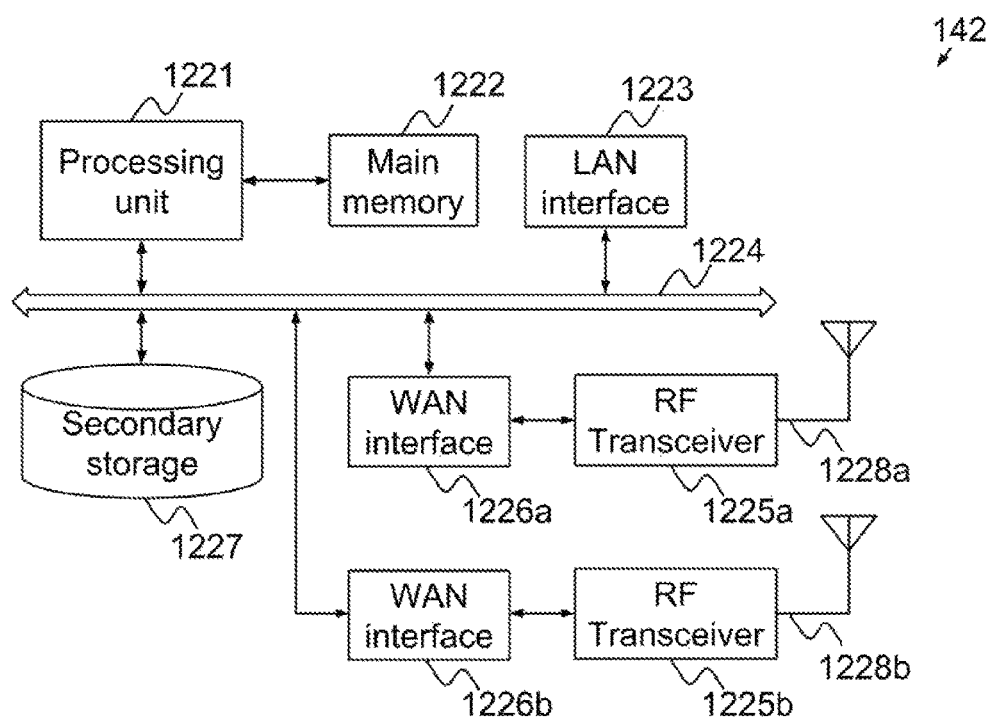
FIG. 12B is an illustrative block diagram of a gateway according to one of the embodiments.

FIG. 12B illustrates of the embodiments of gateway 142 according to the present invention. Gateway 142 comprises processing unit 1221, main memory 1222, LAN interface 1223, system bus 1224, RF transceivers 1225, WAN interfaces 1226, secondary storage 1227 and antennas 1228. Processing unit 1221 and main memory 1222 are connected with each other directly.

WAN interfaces 1226 and RF transceivers 1225 can be connected or coupled with each other directly. Similar to RF transceivers 1205, RF transceivers 1225 may act as a WAN interface. Then WAN interface 1226 may not be needed.

System bus 1224 connects processing unit 1221 directly or indirectly to LAN interface 1223, WAN interfaces 1226 and secondary storage 1227. Using system bus 1224 allows gateway 142 to have increased modularity.

Gateway 142 may form a LAN with other hosts or network nodes via LAN interface 1223. Furthermore, gateway 142 is capable of connecting to two wireless networks through RF transceivers 1225, WAN interfaces 1226 and antennas 1228 if two SIM cards are inserted into gateway 142.

Antennas 1228 is connected directly to RF transceivers 1225. Similar to antenna 1208, antennas 1228 are used to transmit and receive electrical signal to and from a base station.

Figure 13:
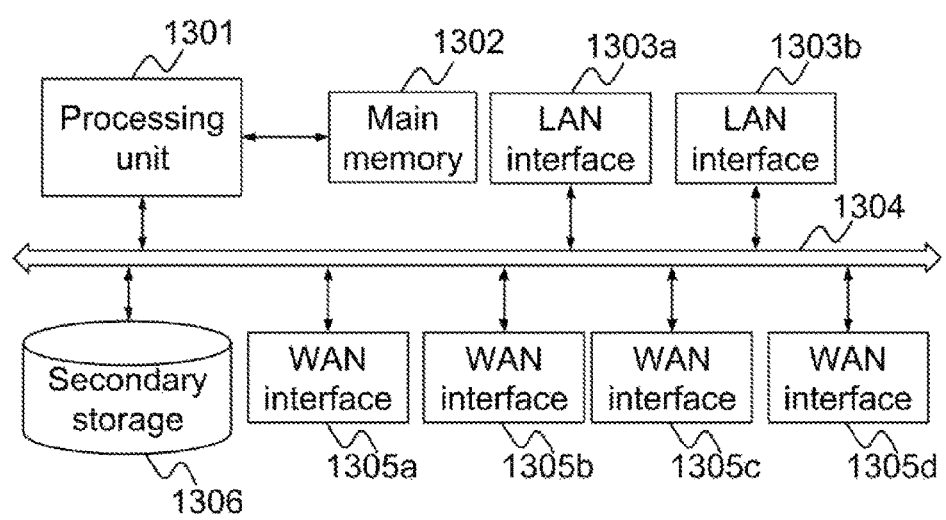
FIG. 13 is an illustrative block diagram of a communication apparatus according to one of the embodiments.

FIG. 13 illustrates the embodiments of a communication apparatus according to the present invention. A Communication apparatus comprises processing unit 1301, main memory 1302, LAN interfaces 1303, system bus 1304, WAN interfaces 1305 and secondary storage 1306. Processing unit 1301 and main memory 1302 are connected with each other directly.

LAN interfaces 1303 are connected to processing unit 1301 via system bus 1304. Hosts or network nodes may form a LAN with a communication apparatus via LAN interfaces 1303.

System bus 1304 connects processing unit 1301 directly or indirectly to LAN interfaces 1303, WAN interfaces 1305 and secondary storage 1207. Using system bus 1304 allows the communication apparatus to have increased modularity.

A Communication apparatus may connect to access network via WAN interfaces 1305. For illustration purposes, WAN interface 1305 a may be an USB interface and may connect to a USB modem. Furthermore, WAN interface 1305 b may be an Ethernet interface. Then the communication apparatus may connect to a wired access network through WAN interface 1305 a or connect to a wireless access network through WAN interface 1305b.

Communication apparatus 101 illustrated in FIG. 1B may have the same architecture and functionality as the communication apparatus illustrated in FIG. 13. WAN interfaces 1305 a, 1305 b, 1305 c and 1305 d correspond to WAN interfaces 103a, 103 b, 103c and 103d respectively. LAN interfaces 1303a and 1303b correspond to LAN interfaces 104a and 104b respectively. In one scenario, a WAN interface can be implemented using a RF transceiver and an antenna. For example, in communication apparatus 101, WAN interface 1305 c which corresponds to WAN interface 103c may be implemented using a RF transceiver and an antenna. In another scenario, a WAN interface can be implemented using an Ethernet interface. For example, in communication apparatus 101, WAN interface 1305 d which corresponds to WAN interface 103d can be implemented using an Ethernet interface. Then communication apparatus 101 may wirely connected to interconnected network 146 using an Ethernet cable.

Figure 1C:
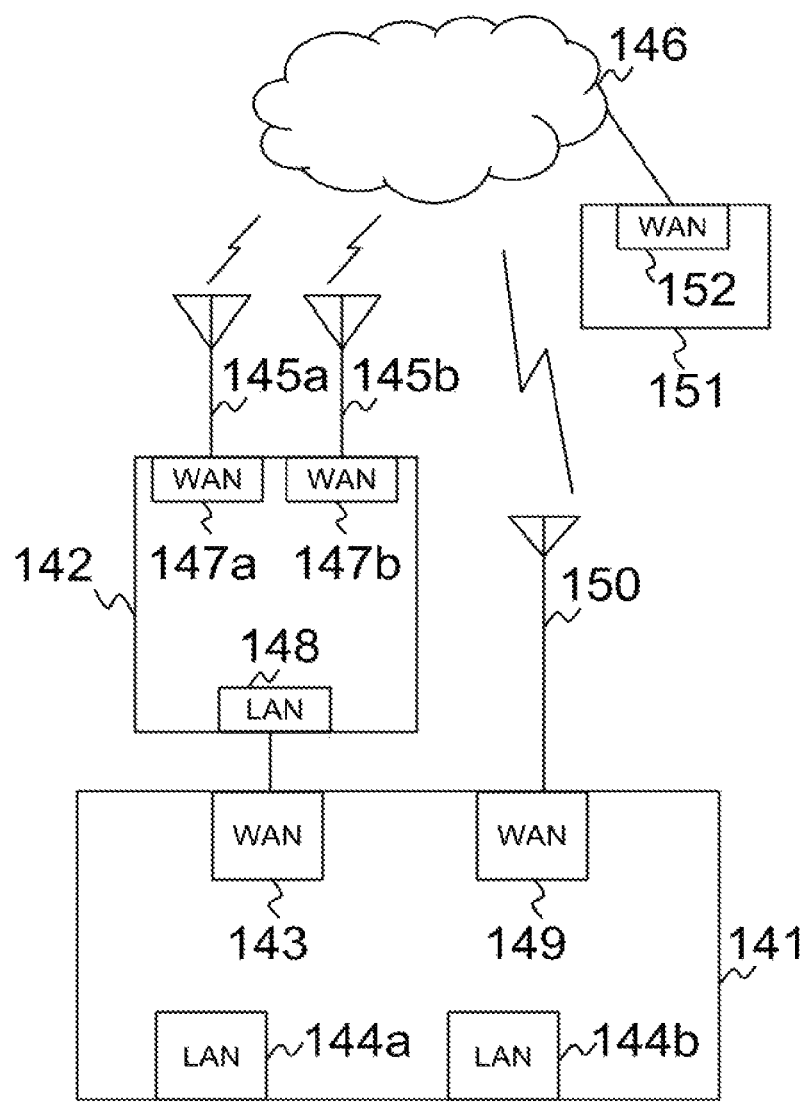
FIG. 1C illustrates a network environment showing connections between one communication apparatus, one gateway and one network node according to one of embodiments.

Furthermore, communication apparatus 120 illustrated in FIG. 1A and communication apparatus 141 illustrated in FIG. 1C can be implemented by the communication apparatus illustrated in FIG. 13. Communication apparatus 120 and 141 may have similar architecture as the communication apparatus illustrated in FIG. 13. For example, communication apparatus 120 and 141 may have processing unit 1301, main memory 1302, LAN interfaces 1303, system bus 1304, etc. It should be noted that the number of LAN interfaces and WAN interfaces in the communication apparatus illustrated in FIG. 13 are not limited to two and four respectively. For example, communication apparatus 120 has one WAN interface and two LAN interfaces. WAN interface 123 of communication apparatus 120 corresponds to WAN interface 1305 a and LAN interfaces 122 of communication apparatus 120 corresponds to LAN interfaces 1303. Similarly, communication apparatus 141 has two WAN interfaces and two LAN interfaces. WAN interfaces 143,149 of communication apparatus 141 may corresponding to WAN interfaces 1305 and LAN interfaces 144 of communication apparatus 141 may corresponding to LAN interfaces 1303.

FIG. 1C illustrates one of the network environments according to the present invention. Communication apparatus 141 is connected to gateway 142 via WAN interface 143. Gateway 142 has WAN interfaces 147 and LAN interface 148. Gateway 142 is capable of wirelessly connect to interconnected network 146 through WAN interfaces 147. For example, WAN interfaces 147 may be implemented by using embedded 3G modems and gateway 142 may have at least two SIM sockets corresponding to the embedded 3G modems. Then gateway 142 may connect to interconnected network 146 using two SIM cards inserted into the two SIM sockets through antennas 145. However, for the present invention, gateway 142 is not limited to use two WAN interfaces and two SIM cards to connect to interconnected network 146. For example, gateway 142 may use either WAN interface 147a or WAN interface 147b to connect to interconnected network 146. For example, gateway 142 has SIM socket A and SIM socket B corresponding to WAN interface 147a and 147b respectively. When a SIM card is inserted into SIM socket A only, gateway 142 may connect to interconnected network 146 through WAN interface 147a and antenna 145a.

Gateway 142 is connected to communication apparatus 141 via LAN interface 148. Communication apparatus 141 may connect to interconnected network 146 through gateway 142. In addition, communication apparatus 141 is capable of connecting to interconnected network 146 via WAN interface 149. For example, WAN interface 149 may be implemented by using an embedded LTE modem and communication apparatus 141 may have a SIM socket. When a SIM card is inserted into the SIM socket, communication apparatus 141 may connect to interconnected network 146 through the embedded LTE modem and antenna 150.

Communication apparatus 141 may have one or more LAN interfaces 144. LAN interfaces 144 may be a wired LAN interface or wireless LAN interface. For example LAN interface 144 a can be a wired Ethernet interface and LAN interface 144 b can be an IEEE 802.11 based LAN interface.

There is no limitation to the wireless technologies used for the embedded modem. For example, the wireless technologies used may include 3G, LTE, HSPA, WiFi, etc.

When communication apparatus 141 receives a packet from one of the LAN interfaces 144 destined to a host reachable through interconnected network 146, it can forward the packet to WAN interface 143 or 149. For illustration purpose, processing unit 1301 of communication apparatus 141 determines to send the packet via WAN interface 143. When gateway 142 is not a slave gateway, communication apparatus 141 cannot control gateway 142 to send the packet to interconnected network 146 through WAN interface 147a or 147b. On the other hand, when gateway 142 is a slave gateway, processing unit 1301 of communication apparatus 141 is capable of controlling gateway 142 to send the packet to interconnected network 146 through WAN interfaces 147a or 147b. As gateway 142 is a slave gateway, it can be controlled by communication apparatus 141 on how to receive and transmit packets. Communication apparatus 141 may create a policy in gateway 142. For example, processing unit 1301 of communication apparatus 141 sets a policy in gateway 142 that packets sent to a first host reachable through interconnected network 146 will be sent via WAN interface 147a and packets sent to a second host reachable through interconnected network 146 will be sent via WAN interface 147b. At gateway 142, when processing unit 1221 of gateway 142 receives the policy, it may store the policy in its local storage medium. When the processing unit 1221 of gateway 142 receives a packet, it examines if the packet should be processed according to one of policies stored. If so, the processing unit 1221 of gateway 142 will process the packet accordingly.

In one variant, communication apparatus 141 can transmit packets to gateway 142 with an instruction on per packet basis. The instruction may be tagged along with the packets; may be sent separately in a different packet; may be embedded in the option field of the packet; may be embedded in a combined packet, which also embeds the packet. In one variant, when the instruction is embedded in the option field of the packet, gateway 142 can remove the instruction from the option field before sending the packet through WAN interface 147a or 147b according to the instruction. In one variant, the instruction is sent on per session basis. The instruction is sent by communication apparatus 141 to gateway 142 at the beginning of the session. There is no need to send the instruction again during the session. All packets belonging to the session will be transmitted according to the instruction. In one variant, the instruction is sent on per IP address basis. Such that all packets destined to a specific IP address reachable through interconnected network 146 is sent according to the instruction. Therefore, one of the benefits to connect communication apparatus 141 with a slave gateway is the ability to granularly determine the method to transmit and receive packets.

There is no limitation of the format of the instruction. For example, the instruction can be in binary format, XML format, JSON format, string and etc. As long as both communication apparatus 141 and gateway 142 recognize the instruction, those who are skilled in the art should appreciate that the instructions can be in myriad formats. Similarly, there are myriad protocols can be used for sending the instruction. There is no limitation of the protocol, for example, HTTP, SSL, CAPWAP, TCP or UDP can be used as the communication protocol.

In one variant, when gateway 142 is operating as a slave gateway, WAN interfaces 147a and 147b may be perceived as two additional WAN interfaces of communication apparatus 141. Such that, communication apparatus 141 is deemed to have four WAN interfaces namely, WAN interface 143, 147a, 147b and 149 such that when a packet is about to be transmitted to interconnected networks 146, processing unit 1301 of communication apparatus 141 can determine which of these four WAN interfaces is used to transmit the packet. For illustration purpose, if the packet is to be transmitted through WAN interface 147a, processing unit 1301 of communication apparatus 141 will send the instruction along with the packet to gateway 142. The instruction may be tagged by processing unit 1301 of communication apparatus 141. When processing unit 1221 of gateway 142 receives the packet and the instruction, processing unit 1221 of gateway 142 then recognize that the packet should be transmitted through WAN interface 147a. Therefore, gateway 142 will send the packet through WAN interface 147a and antenna 145a to interconnected network 146. The instruction received from communication apparatus 141, which is tagged along with a packet which is received from communication apparatus 141, will not be sent to interconnected network 146 as the instruction is only used for communication purpose between communication apparatus 141 and gateway 142.

When processing unit 1301 of communication apparatus 141 does not instruct gateway 142 for WAN interface selection, processing unit 1301 of communication apparatus 141 will not send the instruction along with the packet through WAN interface 143. Processing unit 1221 of gateway 142 will determine rather to use WAN interface 147a or 147b to transmit the packet. Those who are skilled in the art will appreciated that gateway 142 may make the decision based on many criteria, for example: outbound policy configured by the administrator of gateway 142, outbound policy configured by the administrator of communication apparatus 141, network performance observations of WAN interfaces 147a and 147b, monetary cost of sending the packet through WAN interfaces 147a and 147b, etc. Similarly, communication apparatus 141 may make the decision based on similar criteria, for example, outbound policy configured by the administrator of communication apparatus 141.

When processing unit 1301 of communication apparatus 141 uses WAN interface 149 to send packets via antenna 150, there is no need to send the instruction to WAN interface 149 as processing unit 1301 of communication apparatus 141 is not able to control the next network node which receives the packet.

In another embodiment, communication apparatus 141 may perceive WAN interfaces 147a and 147b have replaced WAN interface 143 as packets transmitted and received via WAN interface 143 will also be via WAN interface 147a or 147b. Communication apparatus 141 is deemed to have three WAN interfaces namely, WAN interface 147a, 147b and 149. When a packet is about to be transmitted to interconnected networks 146, processing unit 1301 of communication apparatus 141 can determine which of these three WAN interfaces is used to transmit the packet. Processing unit 1301 of communication apparatus 141 will send an instruction to gateway 142 to instruct processing unit 1221 of gateway 142 which of WAN interfaces 147a or 147b should be used. Alternatively, processing unit 1301 of communication apparatus 141 will send an instruction to gateway 142 to instruct processing unit 1221 of gateway 142 that there is no preference to use WAN interfaces 147a and 147b and processing unit 1221 can determine by itself which of WAN interfaces 147a and 147b is used to transmit the packet.

Comparing the embodiment of perceiving WAN interfaces 147a and 147b replacing WAN interface 143 against the embodiment of perceiving WAN interfaces 147a and 147b as additional WAN interfaces for communication apparatus 141, the benefits of sending data packets through WAN interface 143 without sending instructions to gateway 142 is to allow processing unit of 1221 of gateway 142 to determine which of WAN interfaces 147a or 147b should be used. This may reduce processing loading in communication apparatus 141 and reduce the amount of communication between communication apparatus 141 and gateway 142 as no instruction is sent. On the other hand, the benefits of sending data packets through WAN interface 143 with instructions to gateway 142 allows processing unit 1301 of communication apparatus 141 to have more control in WAN interface selection.

In one variant, when gateway 142 is operating as a slave gateway, gateway 142 submits DNPOR to communication apparatus 141 for determining which WAN interface should be used. For example, when the DNPOR indicates that WAN interface 147b is experiencing large number of packet drops, processing unit 1301 of communication apparatus 141 may determine not to use WAN interface 147b. Processing unit 1301 of communication apparatus 141 may then use WAN interface 147a and WAN interface 149 to transmit packets. Processing unit 1301 of communication apparatus 141 will send an instruction to gateway 142 not to use WAN interface 147a to transmit packets. The instruction, for example, can be sent on per packet basis, on per session basis or on other basis. Alternatively, ANPOR is used instead of DNPOR. Gateway 142 sends ANPOR to communication apparatus 141 and then processing unit 1301 of communication apparatus 141 may send an instruction to gateway 142 based on the ANPOR and contents, destination, type or protocol of the packets to be transmitted. DNPOR is preferred to ANPOR as DNPOR provides more detailed network performance information and will assist processing unit 1301 of communication apparatus 141 to make better decision.

In one variant, when number of packet drops has exceed a threshold, at a WAN interface, which is implemented by a wireless modem, processing unit 1301 of communication apparatus 141 configures the wireless modem to use another wireless communication channel. This may improve the packet drop rate. Alternatively, the wireless modem is reset for hoping to resolve the packet drop problem.

When there is no connection, such as access connection and VPN connection, available at a WAN interface, processing unit of 1301 of communication apparatus 141 will not select the WAN interface for transmitting data packets. Processing unit 1301 is capable of detecting whether WAN interface 149 is connected to an access connection or VPN connection by checking the WAN interface status or its operation system for VPN connection status. Processing unit 1301 determines whether WAN interfaces 147a and 147b are connected to access connections or VPN connections by examining DNPOR or ANPOR received from gateway 142.

There is no limitation to the number of gateway 142 can be connected to communication apparatus 141. For example, for illustration purpose, if communication apparatus 141 has an additional WAN interface and there is another gateway 142 performing as a slave gateway connected to the additional WAN interface, communication apparatus 141 is able to select one or more of the five WAN interfaces for transmitting data packets.

In one variant, a user interface, such as a world-wide wide page or a serial console terminal, can be used to let the administrator of communication apparatus 141 configure how communication apparatus 141 should use gateway 142. In the user interface, for example, the administrator is allowed to select to perceive that WAN interfaces 147a and 147b have replaced WAN interface 143 for data packets outbound policies.

Figure 14A:
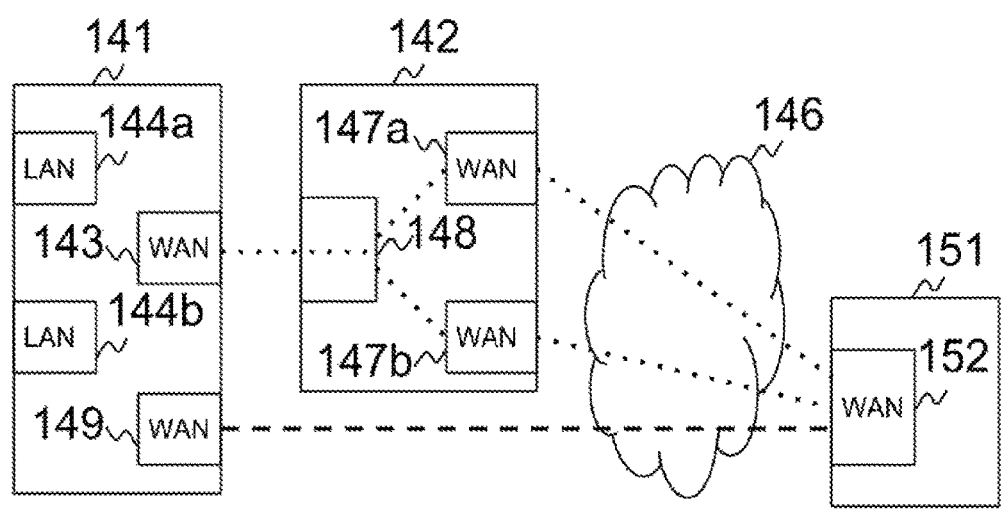
FIG. 14A illustrates a network environment showing VPN connections between one communication apparatus, one gateway and one network node according to one of the embodiments.

FIG. 14A illustrates one of the embodiments according to the present invention. For illustration purpose only, gateway 142 is operating as a non-slave gateway. VPN connections are illustrated by the dotted lines. A first VPN connection is established between WAN interfaces 149 and 152. A second VPN connection is established between WAN interfaces 143 and 152. As the second VPN connection passes through gateway 142 and packets belonging to the second VPN connection may be transmitted and received via WAN interfaces 147a and 147b. Gateway 142 does not need to be aware that the second VPN connection is established through it. Processing unit 1221 of gateway 142 determines how to transmit packets belonging to the second VPN connection.

In one variant, for illustration purpose only, gateway 142 is operating as a slave gateway. When processing unit 1301 of communication apparatus 141 sends a packet belonging to the second VPN, it sends an instruction along with the packet. Then gateway 142 determines to transmit the packet via WAN interface 147a or 147b according to the instruction. In one variance, the instruction is sent on per session basis. Such that packets belonging to the same session and transmitted using the second VPN connection will be transmitted through WAN interfaces 147a or 147b according to the instruction. For example, packets belonging to a video conferencing meeting are transmitted and received using the second VPN connection. An instruction may be sent by communication apparatus 141 to instruct gateway 142 to transmit voice packets of the video conferencing meeting through WAN interface 147a and video packets of the video conferencing meeting through WAN interface 147b. This may improve speed and reliability. For illustration purpose, processing unit 1221 of gateway 142 may examine whether a packet is carrying voice data or video data by examining the port number of the packet.

There is no limitation on the number of VPN connections can be established through one WAN interface. For example, in addition to the first and second VPN connection, there could be a third VPN connection established from WAN interface 143 to WAN interface 152 via WAN interface 147b. The number of VPN connections is in general bounded by processing power of processing unit 1301 of communication apparatus 141 and processing power of processing unit of network node 151.

Figure 14B:
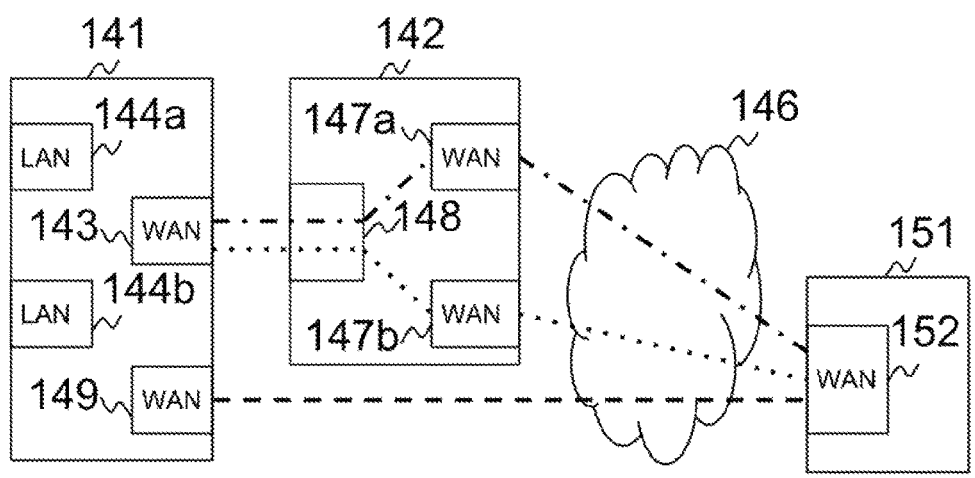
FIG. 14B illustrates a network environment showing VPN connections between one communication apparatus, one slave gateway and one network node according to one of the embodiments.

FIG. 14B illustrates one of the embodiments according to the present invention. When gateway 142 is operating as a slave gateway of communication apparatus 141, communication apparatus 141 establishes three VPN connections with network node 151. The first VPN connection is established between WAN interfaces 143 and 152, and via WAN interface 147a. The second VPN connection is established between WAN interfaces 143 and 152, and via WAN interface 147b. The third VPN connection is established between WAN interfaces 149 and 152. The first, second and third VPN connections are established using IP addresses of WAN interfaces 143, 143 and 149 respectively. Processing unit 1301 of communication apparatus 141 configures or instructs gateway 142 to transmit data packets belonging to the first VPN connection and second VPN connection via WAN interfaces 147a and 147b respectively. When communication apparatus 141 establishes a VPN connection between WAN interfaces 143 and 152, communication apparatus 141 has the VPN configuration parameters for the VPN connection.

In one variant, the first and second VPN connections are established between WAN interfaces 147a and 152 and between WAN interfaces 147b and 152 respectively. The first and second VPN connections are established using the IP address of WAN interfaces 147a and 147b respectively, instead of using IP address of WAN interface 143. When processing unit 1301 of communication apparatus 141 transmits a packet belonging to the first or second VPN connection, it transmits the packet to LAN interface 148 via WAN interface 143 along with an instruction, which informs gateway 142 that the identity of the VPN connection the packet belongs to. Therefore, processing unit 1221 of gateway 142 is able to select the first or the second VPN connection for transmitting the packet. When gateway 142 receives a packet through the first or the second VPN connection, processing unit 1221 forwards the packet to WAN interface 143. When communication apparatus 141 receives the packet from gateway 142, the packet may be decapsulated from an encapsulating packet received at WAN interface 147a or 147b. Alternatively, the encapsulating packet is forwarded to communication apparatus 141, such that processing unit 1301 will decapsulate encapsulating packet to retrieve the packet. One of the benefits using IP addresses of WAN interface 147a and 147b for establishing VPN connections is not to use the IP address of WAN interface 143. For example, when WAN interface 143 is assigned with a private IP address or gateway 142 performs network address translation for WAN interface 143, the IP address of WAN interface 143 may not be used for establishing a VPN connection.

The use of VPN connection between communication apparatus 141 and network node 151 allows a packet received from LAN interfaces 144 be tunneled through to network node 151 and vice versa. The packet may been transmitted through one of the VPN connections established.

According to one of the embodiments of the present invention, a plurality of VPN connections that are established between communication apparatus 141 and network node 151 can be bonded or aggregated together to form an aggregated connection. Some of the plurality of the VPN connections may be established via gateway 142. Communication apparatus 141 may transmit or receive data to or from gateway 142 through the aggregated connection. For example, when gateway 142 is operating as a non-slave gateway, the aggregated connection may be formed by aggregating two VPN connections. One of the two VPN connections may be established through WAN interfaces 143 and 152. The other VPN tunnel may be established through WAN interfaces 149 and 152. The benefits of having data sent through an aggregated connection include higher reliability and security comparing to non-aggregated VPN connection. For example, when the access network connecting to WAN interface 149 is congested or out-of-order, the data can then be sent through VPN connection established through WAN interface 143.

The scope of the invention is not limited to the aggregated VPN connection having only two VPN connections. It may comprise a plurality of VPN connections for higher bandwidth and performance.

For example, the aggregated connection may be formed by aggregating four VPN connections if gateway 142 is operating as a slave gateway. The first VPN connection may be established through WAN interfaces 147a and 152. The second VPN connection may be established through WAN interfaces 147b and 152. The third VPN connection may be established through WAN interfaces 143 and 152. The fourth VPN connection may be established through WAN interfaces 149 and 152. The aggregated VPN connections perform as one VPN connection that a packet received from LAN interfaces 144 can be tunneled through the aggregated VPN connection to WAN interface 152 of network node 151. Similarly, a packet, which is from network node 151 or received by network node 151 through a local network connected to network node 151, can be tunneled to LAN interfaces 144 a or 144 b through the aggregated VPN connection.

The use of aggregated connection provides higher reliability and more bandwidth comparing to use of non-aggregated connection. Processing unit 1301 of communication apparatus 141 may select a VPN connection to distribute data according to the network performance of the VPN connection or a policy. For example, processing unit 1301 of communication apparatus 141 may select a VPN connection which has lighter traffic loads.

Furthermore, the use of aggregated connection provides higher flexibility in choosing different access networks. For example, an aggregated connection may be formed by aggregating three VPN connections if gateway 142 is operating as a slave gateway. The first VPN connection may be established through WAN interfaces 147a and 152. The second VPN connection may be established through WAN interfaces 147b and 152. The third VPN connection may be established through WAN interfaces 149 and 152. Each WAN interface may connect to a access network through a respective RF transceiver. Therefore, communication apparatus 141 may take advantage of different network performances of VPN connections when selecting a VPN connection of the aggregated connection to transmit data.

What is claimed is:

1. A method for distributing data packets through a plurality of wide area network (WAN) interfaces at a network node, wherein a first WAN interface is connected to at least one gateway, comprising the steps of:
- a. sending at least one identification request to the at least one gateway;
- b. determining whether the at least one gateway is configured as a slave gateway;
- c. when the at least one gateway is configured as a slave gateway, transmitting an instruction to the at least one gateway; and
- d. distributing data packets among one or more of the plurality of WAN interfaces, wherein the first WAN interface is one of the plurality of WAN interfaces.

2. The method of claim 1, further comprising the step of:
- e. determining weighting among the one or more of the plurality of WAN interfaces, wherein the step d is performed according to the weighting.

3. The method of claim 1, wherein the at least one gateway has a plurality of WAN interfaces.

4. The method of claim 3, wherein at least one of the plurality of WAN interfaces of the at least one gateway is a wireless modem.

5. The method of claim 3, further comprising the steps of:
- e. establishing a plurality of connections through the plurality of WAN interfaces of the network node and the plurality of WAN interfaces of the at least one gateway; and
- f. determining latency of the connections, wherein the step d is performed according to the latency of the connections.

6. The method of claim 5, further comprising the step of:
- g. not using a first connection of the plurality of connections when the first connection has latency larger than a latency requirement.

7. The method of claim 6, further comprising the step of:
- h. aggregating the plurality of connections to form an aggregated connection.

8. The method of claim 1, further comprising the step of:
- e. when the at least one gateway is configured as a slave gateway, receiving one or more network performance observation report (NPOR) from the gateway.

9. The method of claim 1, further comprising the step of:
- e. establishing a plurality of connections through the one or more of the plurality WAN interfaces.

10. The method of claim 9, further comprising the step of:
- f. aggregating the plurality of connection to form an aggregated connection.

11. A network node, comprising:
- a plurality of wide area network (WAN) interfaces, wherein a first WAN interface of the plurality of WAN interfaces is connected to at least one gateway;
- at least one main memory;
- at least one processing unit; and
- at least one secondary non-transitory computer readable medium storing program instructions executable by the at least one processing unit for performing the steps of:
  - a. sending at least one identification request to the at least one gateway;
  - b. determining whether the at least one gateway is configured as a slave gateway;
  - c. when the at least one gateway is configured as a slave gateway, transmitting an instruction to the at least one gateway; and
  - d. distributing data packets among one or more of the plurality of WAN interfaces, wherein the first WAN interface is one of the plurality of WAN interfaces.

12. The network node of claim 11, wherein the at least one secondary non-transitory computer readable medium stores program instructions executable by the at least one processing unit for further performing the step of
- e. determining weighting among the one or more of the plurality of WAN interfaces, wherein the step d is performed according to the weighting.

13. The network node of claim 11, wherein the at least one gateway has a plurality of WAN interfaces.

14. The network node of claim 13, wherein at least one of the plurality of WAN interfaces of the at least one gateway is a wireless modem.

15. The network node of claim 11, wherein the at least one secondary non-transitory computer readable medium stores program instructions executable by the at least one processing unit for further performing the steps of:
- e. establishing a plurality of connections through the plurality of WAN interfaces of the network node and the plurality of WAN interfaces of the at least one gateway; and
- f. determining latency of the connections, wherein the step d is performed according to the latency of the connections.

16. The network node of claim 15, wherein the at least one secondary non-transitory computer readable medium stores program instructions executable by the at least one processing unit for further performing the step of:
- g. not using a first connection of the plurality of connections when the first connection has latency larger than a latency requirement.

17. The network node of claim 16, wherein the at least one secondary non-transitory computer readable medium stores program instructions executable by the at least one processing unit for further performing the step of:
- h. aggregating the plurality of connections to form an aggregated connection.

18. The network node of claim 11, wherein the at least one secondary non-transitory computer readable medium stores program instructions executable by the at least one processing unit for further performing the step of:
- e. when the at least one gateway is configured as a slave gateway, receiving one or more network performance observation report (NPOR) from the gateway.

19. The network node of claim 11, wherein the at least one secondary non-transitory computer readable medium stores program instructions executable by the at least one processing unit for further performing the step of:
- e. establishing a plurality of connections through the one or more of the plurality WAN interfaces.

20. The network node of claim 19, wherein the at least one secondary non-transitory computer readable medium stores program instructions executable by the at least one processing unit for further performing the step of:
- f. aggregating the plurality of connection to form an aggregated connection.

* * * * *